US006508614B1

United States Patent
Ozaki et al.

(10) Patent No.: US 6,508,614 B1
(45) Date of Patent: Jan. 21, 2003

(54) SPINDLE DEVICE AND MACHINE TOOL UTILIZING THE SAME

(75) Inventors: Takayoshi Ozaki, Iwata (JP); Nobuyuki Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/527,525

(22) Filed: Mar. 16, 2000

(30) Foreign Application Priority Data

| Mar. 17, 1999 | (JP) | 11-071500 |
|---|---|---|
| Mar. 17, 1999 | (JP) | 11-071501 |
| Mar. 17, 1999 | (JP) | 11-071502 |
| Mar. 17, 1999 | (JP) | 11-071503 |
| Mar. 17, 1999 | (JP) | 11-071504 |

(51) Int. Cl.[7] .......................... B23C 1/00; B23Q 11/14; B23Q 15/00
(52) U.S. Cl. ...................... 409/231; 409/135; 409/193; 409/186; 451/7; 310/90.5
(58) Field of Search ................ 409/231, 135, 409/193, 186, 187, 194; 310/90.5; 451/7, 11, 342

(56) References Cited

U.S. PATENT DOCUMENTS

| 3,521,526 A | * | 7/1970 | Olig et al. ............... 409/135 |
| 4,180,946 A | * | 1/1980 | Heijkenskjold et al. .... 310/90.5 |
| 4,533,858 A | * | 8/1985 | Tlaker ..................... 318/634 |
| 4,538,081 A | * | 8/1985 | Kamiya et al. ............ 310/90.5 |
| 4,795,927 A | * | 1/1989 | Morii ...................... 310/90.5 |
| 4,956,945 A | * | 9/1990 | Ooshima .................. 451/11 |
| 5,024,025 A | * | 6/1991 | Kihara et al. .............. 451/11 |
| 5,027,280 A | * | 6/1991 | Ando et al. ............... 310/90.5 |
| 5,093,754 A | * | 3/1992 | Kawashima .............. 310/90.5 |
| 5,133,158 A | * | 7/1992 | Kihara et al. .............. 451/11 |
| 5,187,434 A | * | 2/1993 | Ando ..................... 324/207.25 |
| 5,345,127 A | * | 9/1994 | New ....................... 310/90.5 |
| 5,387,061 A | * | 2/1995 | Barkman et al. .......... 409/135 |
| 5,523,701 A | * | 6/1996 | Smith et al. .............. 324/772 |
| 5,562,528 A | * | 10/1996 | Ueyama et al. ........... 310/90.5 |
| 5,623,857 A | * | 4/1997 | Sakuraba ................. 409/135 |
| 5,739,609 A | * | 4/1998 | Ueyama et al. ........... 310/90.5 |
| 5,772,564 A | * | 6/1998 | Taniguchi et al. ......... 409/231 |
| 6,140,931 A | * | 10/2000 | Yamane et al. ........... 340/686.6 |
| 6,208,051 B1 | * | 3/2001 | Ando ...................... 310/90.5 |
| 6,288,465 B1 | * | 9/2001 | Suzuki et al. ............. 310/90.5 |
| 6,380,652 B1 | * | 4/2002 | Ueyama et al. ........... 310/90.5 |

FOREIGN PATENT DOCUMENTS

EP          0875685 A2  *  11/1998

OTHER PUBLICATIONS printout from www.suppliersonline.com about INVAR material, printed May 30, 2002, three pages.*
printout from www.reade.com about INVAR material, printed May 30, 2002, copyright 1997, two pages.*
printout from www. espi–metals.com about INVAR 36 material, printed May 30, 2002, seven pages.*
Patent Abstracts of Japan, Publication No. 11013759, dated Jan. 22, 1999.

* cited by examiner

Primary Examiner—A. L. Wellington
Assistant Examiner—Erica E Cadugan
(74) Attorney, Agent, or Firm—Sughrue Mion, PLLC

(57) ABSTRACT

A spindle device equipped with a combined externally pressurized gas-magnetic bearing assembly, and a machining apparatus utilizing the spindle device. The spindle device is capable of accomplishing a high speed rotation with high rotational precision and includes a main shaft (4) rotatably supported by the combined bearing assembly (6 to 9), an electric current detecting device (15 to 18) disposed in a spindle controller (3) for detecting a current supplied to electromagnets of the combined bearing assembly (6 to 9). Also provided is a machining status determining device (19) for determining the machining status in reference to the current detected by the current detecting device (15 to 18). The machining status may be an indication of the extent to which a machining tool is impaired.

38 Claims, 25 Drawing Sheets

SPINDLE DEVICE AND MACHINE TOOL UTILIZING THE SAME

BACKGROUND OF THE INVENTION

1. Field of the Invention

The present invention relates to a spindle device and, more particularly, to the spindle device provided with externally pressurized gas bearings or combined externally pressurized gas-magnetic bearings and also to a machining apparatus equipped with the same.

2. Description of the Prior Art

In recent years, a highly efficient, highly precise machining has drawn keen attentions in the field of a mold machining field. In order to implement such a machining, it is necessary to use a spindle device capable of accomplish a high speed rotation with high rotational precision and having a static stiffness and a dynamic stiffness, and it is also required to perform the machining under optimum machining conditions by detecting the status of machining.

To meet these requirements, the applicant has suggested a hybrid type non-contact bearing assembly in which externally pressurized gas bearings and magnetic bearings are combined together as disclosed in the Japanese Laid-open Patent Publication No. 11-013759. According to this suggestion, by utilizing an excellent dynamic stiffness and a rotational precision, both exhibited by the externally pressurized gas bearing, and an excellent static stiffness exhibited by the magnetic bearing, a compact bearing assembly making advantages of those different types of bearings can be obtained. Also, measurement of a machining load of a machine tool for detection of the machining status is generally carried out by a system in which the load during the machining is inferred from a value measured of a motor output for rotating the main shaft.

However, the system of inferring the load during the machining in reference to the motor output measured value as hereinabove described has a problem in that a measuring instrument designed exclusively for that purpose is required, resulting in increase of the system cost.

Also, the system of detecting the machining status in reference to the motor output measured value is incapable of detecting the machining status associated with the frequency of rotation of the main shaft.

Apart therefrom, in the spindle device in which the main shaft is rotatably supported by the magnetic bearings, a system has also been suggested to detect the machining status in reference to the excitation current supplied to the magnetic bearings. However, mere support of the main shaft solely by means of the magnetic bearings makes it difficult to secure a high precision of high speed rotation and a high dynamic stiffness. Also, in the system of detecting the machining status in reference to the excitation current supplied to the magnetic bearings, an attempt has been made to detect the machining status associated with the frequency by the use of a frequency filter. However, to detect the machining status with respect to a number of frequency regions requires the use of an increased number of frequency filters, resulting in complicated structure and increase of the cost.

In order to achieve a highly efficient, highly precise machining, the spindle device is required of a type capable of achieving a high speed rotation with a high rotational precision. To satisfy this requirement, a non-contact bearing is suitable. The spindle device of a non-contact bearing supported type is available in some types for example, a spindle device utilizing an externally pressurized gas bearing and a spindle device utilizing a magnetic bearing. The spindle device with the externally pressurized gas bearing has a rotational precision generally in the order of $1/100\mu m$ and is therefore suited for the highly precise machining, but has a problem in that the static stiffness and the load bearing capacity are small. On the other hand, the spindle device with the magnetic bearing is excellent in terms of dynamic stiffness and load bearing capacity, but has a low accuracy of rotation of the main shaft. This is because the accuracy of rotation of the main shaft exhibited by the magnetic bearing depends on the resolution of a sensor disposed for detecting the position of the main shaft.

In general, the highly efficient, highly accurate machining is carried out in two stages including rough and finish machining processes. During the rough machining process, the amount of material that is machined per unitary time is increased to achieve a highly efficient machining, but during the finish machining process, the amount of the material to be machined is conversely reduced to achieve a highly precise machining process. For this reason, during the rough machining process, the load acting on the main shaft tends to increase and, therefore, the spindle device must have such a spindle performance requiring the stiffness and the load bearing capacity while rotation with a high precision is required during the finish machining process.

The combined externally pressurized gas-magnetic bearing assembly suggested in the previously discussed Japanese Laid-open Patent Publication No. 11-013759 is of a type effective to satisfy those requirements.

However, the combined externally pressurized gas-magnetic bearing assembly has characteristics peculiar to the externally pressurized gas bearing and those peculiar to the magnetic bearing and, where the sensor for the magnetic bearing has a low resolution, since the rotational precision of the main shaft depends on this resolution, a high rotational precision exhibited by the externally pressurized gas bearing cannot be effectively utilized.

Also, although the combined externally pressurized gas-magnetic bearing assembly of the type discussed above is a non-contact bearing, there is the possibility that the main shaft may contact a bearing surface in the event that an excessive load acts. To avoid such a contact of the main shaft, a protective bearing such as a rolling bearing has hitherto been employed in the prior art spindle device equipped with the magnetic bearing. However, since the combined externally pressurized gas-magnetic bearing assembly is of a design wherein the externally pressurized gas bearing is formed in the magnetic bearing unit, the gap between the main shaft in the bearing unit and a magnetic bearing stator is so small, for example, not greater than some tens microns and, therefore, the protective bearing in the form of the rolling bearing generally used in the spindle device with the magnetic bearing cannot be used. Also, since the externally pressurized gas bearing surface forms a part of an electromagnet for the magnetic bearing, material for the externally pressurized gas bearing surface is limited to a ferromagnetic substance having no lubricating capability. For this reason, in the event that an excessive load is applied to the spindle device, contact between the main shaft and the bearing surface brings about a detrimental influence on the bearing unit.

Also, in the spindle device utilizing the non-contact bearing such as the previously discussed combined externally pressurized gas-magnetic bearing assembly or externally pressurized gas bearing, as shown in FIG. 29, the main shaft 4 has a collar 4a formed therein, opposite end faces of the collar 4a being generally utilized to form axial bearing surfaces.

In the spindle device utilizing such a non-contact bearing, as discussed with reference to FIG. 29, the axial position (C dimension) of a tip of a machining tool 11 fitted to the main shaft varies depending on the dimension (B dimension) of a housing 5 as measured from the position P, at which the spindle is fitted and the collar 4a of the main shaft 4 and the dimension (A dimension) of the main shaft 4 as measured from the collar 4a of the main shaft and the tip of the machining tool 11. The spindle fitting position P represents the position at which the housing 5 is mounted on a spindle support bench 76 that is reciprocally driven by a spindle positioning mechanism 54.

When the spindle device of the structure described is driven at a high speed, the temperature of any of the main shaft 4 and the housing 5 increases as a result of a loss (windage loss) at the externally pressurized gas bearing unit and the axial position (C dimension) of the tip of the machining tool changes with the amount of thermal expansion in a direction axially of the main shaft that is brought about by increase of the temperature of the main shaft and the housing. For this reason, it has been difficult to achieve a highly precise machining.

In addition, the combined externally pressurized gas-magnetic bearing assembly has characteristics that are generally exhibited by the externally pressurized gas bearing and the magnetic bearing, respectively, as hereinbefore described. Accordingly, where the sensor for the magnetic bearing has a low resolution, the rotational precision of the main shaft depends on this resolution and, therefore, the high rotational precision generally exhibited by the externally pressurized gas bearing cannot be effectively utilized.

SUMMARY OF THE INVENTION

In view of the foregoing, the present invention has been devised to substantially eliminate the above described problems and is intended to provide an improved spindle device equipped with the combined externally pressurized gas-magnetic bearing assembly, and an improved machining apparatus utilizing the same, both of which can rotate at a high speed with high rotational precision.

To facilitate a better understanding of the present invention, first to sixth structures of the present invention will be made using reference numerals used in FIG. 1. The spindle device according to the first structure of the present invention is provided with at least one combined externally pressurized gas-magnetic bearing assembly (6 to 9) for rotatably supporting a main shaft (4), having a machining tool (11) fitted to a tip thereof, and also with a spindle drive source (10) for rotating the main shaft (4). The combined externally pressurized gas-magnetic bearing assembly comprises at least one externally pressurized gas bearing (6A to 9A) and at least one magnetic bearing (6B to 9B) combined together. The spindle device includes an electric current detecting means (11 to 18) for detecting an excitation current for the magnetic bearing (6B to 9B), and a machining status determining means (19) for determining a machining status performed by the machining tool (11) in reference to a current value detected by the current detecting means (11 to 18).

According to this structure, the machining status can be grasped by the machining status determining means (19) in reference to the current detected value of the energization current supplied to the magnetic bearing (6B to 9B) in the combined externally pressurized gas-magnetic bearing assembly (6 to 9). In other words, in the event that the main shaft (4) tends to displace in a radial direction by the effect of a load acting on the machining tool (11) during the machining operation, the energization current of the magnetic bearings (6B to 9B) is varied by a control function possessed by the magnetic bearing (6B to 9B) so as to restore the displacement. For this reason, the machining status such as, for example, wear of the machining tool, damage to the machining tool and/or improper machining can be determined in reference to the energization current. Thus, the provision of the machining status determining means (19) is effect to increase the function of the combined externally pressurized gas-magnetic bearing assembly (6 to 9), that is, to accomplish a high speed rotation and, in combination of a high rotational precision, a high static stiffness and a high dynamic stiffness, the machining is possible under optimum machining conditions while the machining status is detected, wherefore a highly precise machining can be effected at a high efficiency while merits of the combined externally pressurized gas-magnetic bearing assembly (6 to 9) are utilized. Moreover, for detectors the use of the current detecting means (15 to 18) of the energization current of the magnetic bearing (6B to 9B) is sufficient, and no load measuring device need be used outside, and as compared with detection of the current flowing through the motor, simplification can be achieved with reduction in cost.

In a preferred embodiment of the first structure of the present invention, the current detecting means (15 to 18) is provided in a spindle controller (3) for controlling the combined externally pressurized gas-magnetic bearing assembly (6 to 9). With this design, the provision of the current detecting means (15 to 18) in the spindle controller (3) is effective to render it to be compact and easy to handle.

Also, in another preferred embodiment of the present invention, the machining status determining means (19) includes a current smoothing unit for smoothing the current value detected by the current detecting means, and a machining status determining unit for converting a smoothed output from the current smoothing unit into a static load acting on the main shaft and for determining the machining status in reference to a result of calculation of the static load. Thus, by grasping the machining status in reference to the result of conversion of the static load, monitoring of the machining status necessary for control can be simply and precisely accomplished without being affected by change in load occurring in a minute time and any external disturbance.

The spindle device according to the second structure of the present invention is provided with at least one combined externally pressurized gas-magnetic bearing assembly (6 to 9) for rotatably supporting a main shaft (4), having a machining tool (11) fitted to a tip thereof and, also, with a spindle drive source (10) for rotating the main shaft (4). The combined externally pressurized gas-magnetic bearing assembly (6 to 9) includes at least one externally pressurized gas bearing (6A to 9A) and at least one magnetic bearing (6B to 9B) combined together. The spindle device includes a displacement detecting means (28, 38) for detecting a displacement of the main shaft (4), and a machining status determining means (19) for determining a machining status performed by the machining tool (11) in reference to a displacement value detected by the displacement detecting means (28, 38).

According to this structure, when the main shaft (4) undergoes displacement by the effect of a load acting on the machine tool (11) during the machining operation, the displacement detecting means (28, 38) detects such displacement. For this reason, the machining status can be determined in reference to the displacement value detected by the displacement detecting means (28, 38). Accordingly, the provision of the machining status determining means (19) is effect to increase the function of the combined externally pressurized gas-magnetic bearing assembly (6 to 9), that is, to accomplish a high speed rotation and, in combination of a high rotational precision, a high static stiffness and a high dynamic stiffness, the machining is possible under optimum machining conditions while the machining status is detected, wherefore a highly precise machining can be effected at a high efficiency while merits of the combined externally pressurized gas-magnetic bearing assembly (6 to 9) are utilized. Moreover, since the displacement detecting means (28, 38) represents a detecting means generally used in the magnetic bearing (6B to 9B) for controlling the magnetic bearing (6B to 9B), the machining status can be grasped with no dedicated detecting means used and, therefore, the machining precision can be increased at a reduced cost.

In the embodiment according to any one of the first and second structures of the present invention, the machining status determining means (19) may include a frequency analyzing unit for frequency analyzing an output from the current detecting means (15 to 18) or the displacement detecting means (28, 38), and a machining status determining unit for determining the machining status in reference to an amplitude of each of frequency components during a machining, which components are outputted from the frequency analyzing unit.

The load acting on the machining tool is represented by a vibration of the machining tool in view of the natural vibration of the machining tool, a work and the machine tool or the number of revolution of the main shaft, and the machining status such as damage to the machining tool gives rise to a peculiar tendency in the frequency of vibration depending on the type of machining defects. For this reason, by employing the previously described embodiment in which the use has been made of the frequency analyzing unit in combination with the machining status determining unit for determining the machining status in reference to the amplitude of each of the frequency components during the machining, a highly precise machining status which cannot be achieved with detection of the load-in which the frequency components are averaged can be achieved. Also, since the frequency analysis is carried out, analysis of a number of frequency regions is possible with a simplified construction as compared with the use of frequency filters.

In a preferred embodiment according to any one of the first and second structures of the present invention, the spindle drive source (10) includes a motor built in a housing (10) in which the combined externally pressurized gas-magnetic bearing assembly (6 to 9) is housed. Thus, in the spindle device having the spindle drive source built therein, the various effects brought about by the previously described structures of the present invention can be effectively appreciated.

Also, In a preferred embodiment according to any one of the first and second structures of the present invention, the use is made of a spindle controller (3) for controlling the externally pressurized gas-magnetic bearing assembly (6 to 9), and an external output means (44) for outputting to an outside of the spindle controller (3) one of a current value detected by the current detecting means (15 to 18), a smoothed output from a current smoothing unit, and an amplitude of each of frequency components outputted from a frequency analyzing unit. Thus, the provision of the external output means (44) is effective to allow the load on the machining tool (11) to be monitored outside the spindle controller (3). By way of example, by monitoring the load on the machining tool (11) by means of a numerical control device (14) of the machining apparatus (13) equipped with the spindle device (1), an independent information processing means or the like, the machining status can be determined.

A remotely machining status determining spindle device according to a third structure of the present invention includes the spindle device (1) of any one of the previously described structures of the present invention, an information processing means (58) installed at a remote place distant from the spindle device (1), a communication means (58) for communicating one of an output from a machining status determining means (19) of the spindle device (1), a current value detected by the current detecting means (15 to 18), a smoothed output from a current smoothing unit, and an amplitude of each of frequency components outputted from a frequency analyzing unit, to an information processing means (72) installed at the remote place through a communication line (59). The information processing means (72) has a function of performing a predetermined process on the communicated information.

By providing the spindle device with a capability of performing communication through the communication line (59), the load on the machining tool and the machining status thereof can be grasped at the remote place and it is possible to intensively manage and control a number of spindle devices and machining tools at the remote place.

The spindle device (1) according to the fourth structure of the present invention is provided with at least one combined externally pressurized gas-magnetic bearing assembly (6 to 9) for rotatably supporting a main shaft, having a machining tool (11) fitted to a tip thereof, a spindle drive source (10) for rotating the main shaft (4) and a spindle controller (3) for controlling the combined externally pressurized gas-magnetic bearing assembly (6 to 9) of a type in which at least one externally pressurized gas bearing (6A to 9A) and at least one magnetic bearing (6B to 9B) combined together. The spindle device (1) includes an externally command responsive ON-OFF means (20) for turning energization of the magnetic bearing (6B to 9B) on and off in response to a command supplied from an outside of the spindle controller (3).

According to this structure, when the magnetic bearing (6B to 9B) is turned off, the main shaft (4) can be rotatably supported only by the externally pressurized gas bearing (6A to 9A) of the combined externally pressurized gas-magnetic bearing (6 to 9), but when the magnetic bearing (6B to 9B) are turned on, the main shaft (4) can be rotatably supported by both the externally pressurized gas bearing (6A to 9A) and the magnetic bearing (6B to 9B). The support by both bearings (6A to 9A, 6B to 9B) and the support only by the externally pressurized gas bearing (6A to 9A) can be switched one over the other in response to the command supplied from the outside of the spindle controller (3). For this reason, an optimum bearing set-up appropriate to a desired machining condition can be carried out at any desired time, allowing the combined externally pressurized gas-magnetic bearing assembly (6 to 9) to exhibit its full function to thereby secure an increased high rotational precision.

In a preferred embodiment of the fourth structure of the present invention, the external command for turning the energization on and off is supplied from a numerical control device (14) of a machining apparatus (13) equipped with the spindle device (1). Thus, by applying the energization ON-OFF command from the numerical control device (14), the optimum bearing can be set quickly according to the machining condition that varies with progress of the machining operation.

A machining apparatus according to the fifth structure of the present invention is a machining apparatus equipped with the spindle device (1) having the combined externally pressurized gas-magnetic bearing assembly (6 to 9) according the fourth structure of the present invention. This machining apparatus includes a numerical control device (14) for controlling a machine section (13a) of the machining apparatus (13) and an energization ON-OFF command generating means (45) for applying an energization ON-OFF command to the external command responsive ON-OFF means (20).

Preferably, the external command for turning the energization on and off is a command that turns on the magnetic bearing during a rough machining the magnetic bearing, but turns the magnetic bearing off during a finish machining. In this way, a high efficiency can be achieved during the rough machining process while a high precision can be achieved during the finish machining process, and, accordingly, a highly efficient, high precise machining can be achieved.

A remote controlled spindle device according to the sixth structure of the present invention includes any one of the spindle devices (1) equipped with at least one combined externally pressurized gas-magnetic bearing assembly according to the fourth structure of the present invention, in combination with a information processing means (72) installed at a remote place distant from the spindle controller (3) and capable of communicating with the spindle controller (3) through a communication line (59). The information processing means (72) has a function of applying a command to an external command responsive ON-OFF means (20). In this structure, change of the bearing setting can be carried out at the remote place and an intensive change of the bearing setting can be carried out at the remote place with respect to a number of the spindle devices The seventh structure of the present invention will now be described using reference numerals used in FIGS. 19 and 20 for the purpose of facilitating a better understanding thereof. A spindle device (1A) according to the seventh structure is equipped with at least one combined externally pressurized gas-magnetic bearing assembly (6, 7) in which at least one externally pressurized gas bearing (6a, 7A) and at least one magnetic bearing (6B, 7B) are combined together. The spindle device (1A) includes a main shaft (4) rotatably supported by the combined bearing assembly (6, 7), and a housing (5) accommodating the combined bearing assembly (6, 7) and the main shaft (4) therein, slide members (47) disposed within the housing (5) and positioned adjacent the main shaft (4) with a radial gap (d3) defined between them and the main shaft (4). The radial gap (d3) has a size smaller than a radial bearing gap (d1) defined by the externally pressurized gas bearing (6A, 7A) and the magnetic bearing (6B, 7B) both forming respective part of the combined bearing assembly (6, 7). Each of the slide members (47) is made of carbon or graphite.

According to this structure, even when an excessive load acts on the main shaft (4) and a mechanical contact occurs between the main shaft (4) and a member on a stationary side, such mechanical contact would be a contact between the slide members (47) and the main shaft (4). Also, since the slide members are made of carbon or graphite, the coefficient of friction thereof is small. For this reason, neither the main shaft (4) nor the bearing surfaces (6Aa, 7Aa) and the slide members (47), all employed in the spindle device (1A), will be impaired by the previously described contact.

In a preferred embodiment of the seventh structure discussed above, the magnetic bearing (6B, 7B) of the combined bearing assembly (6, 7) has a bearing core (23) which defines an externally pressurized gas bearing surface (6Aa, 7Aa). Where the externally pressurized gas bearing surface (6Aa, 7Aa) is defined by the core (23) of the magnetic bearing (6B, 7B), the bearing structure can be simplified, but material for the externally pressurized gas bearing surface (6Aa, 7aa) is limited to a ferromagnetic metal which has normally no lubricating property and, therefore, it is important to avoid any possible contact thereof with the main shaft (4). For this reason, it is effective to avoid any possible damage to the main shaft (4) by allowing the latter to be supported by the slide members (47).

In a preferred embodiment of the seventh structure of the present invention, the slide members (47) are disposed on respective side of one or an array of combined externally pressurized gas-magnetic bearing assemblies (6, 7) adjacent respective opposite ends of the main shaft (4). By positioning the slide members (47) on respective sides of the combined externally pressurized gas-magnietic bearing assembly or assemblies (6, 7) adjacent the opposite ends of the main shaft (4), the main shaft (4) can be assuredly supported by the slide members (47) even when the main shaft (4) tends to tilt under the influence of an excessive radial load, thereby avoiding any possible direct contact of the main shaft (4) with the bearing surface (6Aa, 7Aa).

Preferably, the slide member has a Shore hardness of not smaller than 50, a bending strength of not smaller than 400 Kgf/cm$^2$, a compressive strength of not smaller than 700 Kgf/cm$^2$ and a coefficient of thermal expansion of not greater than $5\times10^{-6}$. The use of the specific material for the slide members (47) having such a hardness, bending strength and a compressive strength, any possible damage to the slide members (47) which would be brought about by contact with the main shaft (4) can advantageously be avoided. Also, selection of the coefficient of thermal expansion of the slide members (47) within the specific range described above is advantageous in that it becomes equal to or smaller than the coefficient of thermal expansion of a soft magnetic metal generally used as a material for the cores (23) of the magnetic bearings (6B, 7B) of the combined externally pressurized gas-magnetic bearing assembly (6, 7) and, therefore, expansion of the inner diameter of the slide members (47) as a result of thermal expansion will become equal to or smaller than that of the cores (23). For this reason, even when an excessive load acts on the main shaft (4) during increase of temperature, it is effectively supported by the slide members (47). It is to be noted that the carbon or graphite used as material for the slide members (47) are effective to satisfy the above described requirements.

The eighth structure of the present invention will now be described using reference numerals used in FIGS. 22 for the purpose of facilitating a better understanding thereof. The spindle device (1C) according to the eighth structure of the present invention makes use of the spindle device including a main shaft (4), at least one combined externally pressurized gas-magnetic bearing assembly (6, 7) comprising at least one externally pressurized gas bearing (6A, 7A) and at least one magnetic bearing (6B, 7B) combined together for supporting the main shaft (4) rotatably, and a housing (5)

accommodating the main shaft (4) and the combined bearing assembly (6, 7) therein.

The spindle device of the eighth structure comprises a temperature measuring means (77) for measuring a temperature of the housing (5) and a temperature measurement associated output means (78) for obtaining a predetermined output in reference to a temperature value detected by the temperature measuring means (77). The predetermined output from the temperature measurement associated output means (78) is represented by at least one of (i) an output from the temperature measuring means (77) (that is, the temperature measured value), (ii) a converted value obtained by converting the temperature value measured by the temperature measuring means (77) into an axial position of a tip of the main shaft (4) or an axial position of a member fitted to the tip of the main shaft (4), according to a predetermined thermal displacement calculation, and (iii) an abnormality signal determined by comparing the temperature value measured by the temperature measuring means (77) or the converted value with a predetermined value.

The converted value referred to above may be any value that can be handled as a position data and, for example, a value proportional to the data representative of the actual position or a value representative of the amount of displacement from a reference position can be equally employed therefore.

According to this structure discussed above, even when the temperature of the spindle device (1C) increases as a result of generation of heat resulting from a loss (windage loss) of the externally pressurized gas bearing, the amount of feed can be compensated by the utilization of the temperature measured value outputted from the temperature measurement associated output means (78) and the converted value of the axial position that has been calculated according to the thermal displacement calculation, thereby allowing the work to be machined with high precision. In the event that the output from the temperature measurement associated output means (78) is an abnormality signal, a suitable procedure such as immediate halt of the spindle device (1C) can be carried out quickly by detecting the abnormality signal outside the spindle controller at the time of occurrence of abnormality in the spindle device such as an excessive increase of the housing temperature.

In a preferred embodiment of the eighth structure of the present invention, the main shaft (4) is made of a material having a low coefficient of thermal expansion. The axial position of the tip of the main shaft (4) or the member (11) such as the machining tool fitted to the tip of the main shaft is associated with both the thermal expansion of the housing (5) and that of the main shaft (4). However, since the main shaft (4) is driven at a high speed, it is difficult to achieve the temperature measurement. For this reason, the material having a low coefficient of thermal expansion is employed for the main shaft (4) while the position of the tip of the main shaft (4) or the member (11) fitted to the tip of the main shaft (4) is compensated for displacement resulting from the thermal expansion by measuring the temperature of the housing (5). By so doing, an accurate compensation for the thermal expansion can be easily accomplished, allowing a highly precise machining to be implemented.

In a preferred embodiment of the eighth structure, the use is made of an external output means (87) for outputting the predetermined output from the temperature measurement associated output means (78) to an outside of the spindle device (1C). The provision of the external output means (87) in this way allows the numerical control device (14) or any other information processing means, employed in the machining apparatus (13) equipped with the spindle device (1C), to provide the output with which thermal displacement compensation of the spindle position and that to be effected at the time of abnormal temperature can easily be performed.

In a further preferred embodiment of the eighth structure of the present invention, the external output means (87) can communicate with the outside of the spindle device (1C) through a communication line (59). Allowing the external output means to communicate with the outside of the spindle device through the communication line (59) makes the remote information processing means installed at the remote place to monitor the status of thermal displacement of the spindle device (1C), to apply a suitable command and to perform a statistics processing.

In a further preferred embodiment of the eighth structure of the present invention, the temperature measurement associated output means (78) outputs a digital signal. Allowing the temperature measurement associated output means to output the digital signal makes it possible for the digital signal to be handled easily.

In a still further preferred embodiment of the eighth structure of the present invention, the use is made of a writing means (80) for causing the temperature value, outputted from the temperature measurement associated output means (78), or an output of the converted value from the temperature measurement associated output means (78), to be inputted to and stored in a storage means (79).

Where the use is made of the writing means (80) and the storage means (79), a reading means (81) may be employed for outputting data, stored in the storage means (79), outputted from the storage means (79) in response to a command applied from the outside of the spindle device (1C). By allowing the stored data to be outputted in response to the command from the outside, the stored data of the storage means (79) can easily be handled.

In a still further preferred embodiment of the eighth structure of the present invention, the use is made of a cooling means (73) for cooling the housing (5) in which the main shaft (4) is installed, and a cooling control means (82) for controlling an cooling operation of the cooling means (73) in response to the output from the temperature measurement associated output means (78). By controlling the cooling means (73) with the output associated with the result of temperature measurement, the housing (5) can be properly cooled in an easy fashion.

In a still further preferred embodiment of the eighth structure of the present invention, a spindle positioning mechanism (54) is employed for moving the housing (4) with the main shaft (4) therein in a direction axially of the main shaft (4). A temperature compensating means (83) is also employed for controlling the spindle positioning mechanism (54) according to the temperature value or the converted value outputted from the temperature measurement associated output means (78). Where the spindle positioning mechanism (54) is thus employed, and by performing a temperature compensation control of the spindle position in reference to the temperature measured value or its converted value, the work can be highly precisely machined.

The ninth structure of the present invention is directed to a mold machining apparatus employing the spindle device according to the previously described first structure of the present invention.

The tenth structure of the present invention is directed to a mold machining apparatus employing the spindle device according to the previously described second structure of the present invention.

The eleventh structure of the present invention is directed to a mold machining apparatus employing the spindle device according to the previously fourth structure of the present invention.

The twelfth structure of the present invention is directed to a mold machining apparatus employing the spindle device according to the previously described seventh structure of the present invention.

In describing preferred embodiments of any one of the ninth to twelfth structures of the present invention, reference numerals shown in FIG. 26 are utilized to facilitate a better understanding thereof. The spindle drive source (19) for driving the main shaft (4) is preferably employed in the form of a motor built in the housing (5) in which the main shaft (4) is rotatably installed.

In a preferred embodiment of any one of the ninth and tenth structure of the present invention, the use is made of a communication means (58) for transmitting the machining status determined by the machining status determining means (19) to a remote place through a communication line (59). According to this feature, since the spindle device has a capability of performing communication through the communication line (59), not only can the machining status such as, for example, the load acting on the machining tool be determined at the remote place, but also a number of the spindle devices in the mold machining apparatuses at remote places can be controlled and supervised intensively.

Also, in a further preferred embodiment of any one of the eleventh and twelfth structures of the present invention which will be described using reference numerals employed in FIGS. 27 and 28, a communication means(58) is utilized for transmitting the output from the temperature measurement associated output means (78) to a remote place through a communication line (59). By so doing, the thermal displacement status resulting from the temperature of the housing (5) and temperature change thereof can be grasped at the remote place and, therefore, an intensive control is possible at the remote place.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
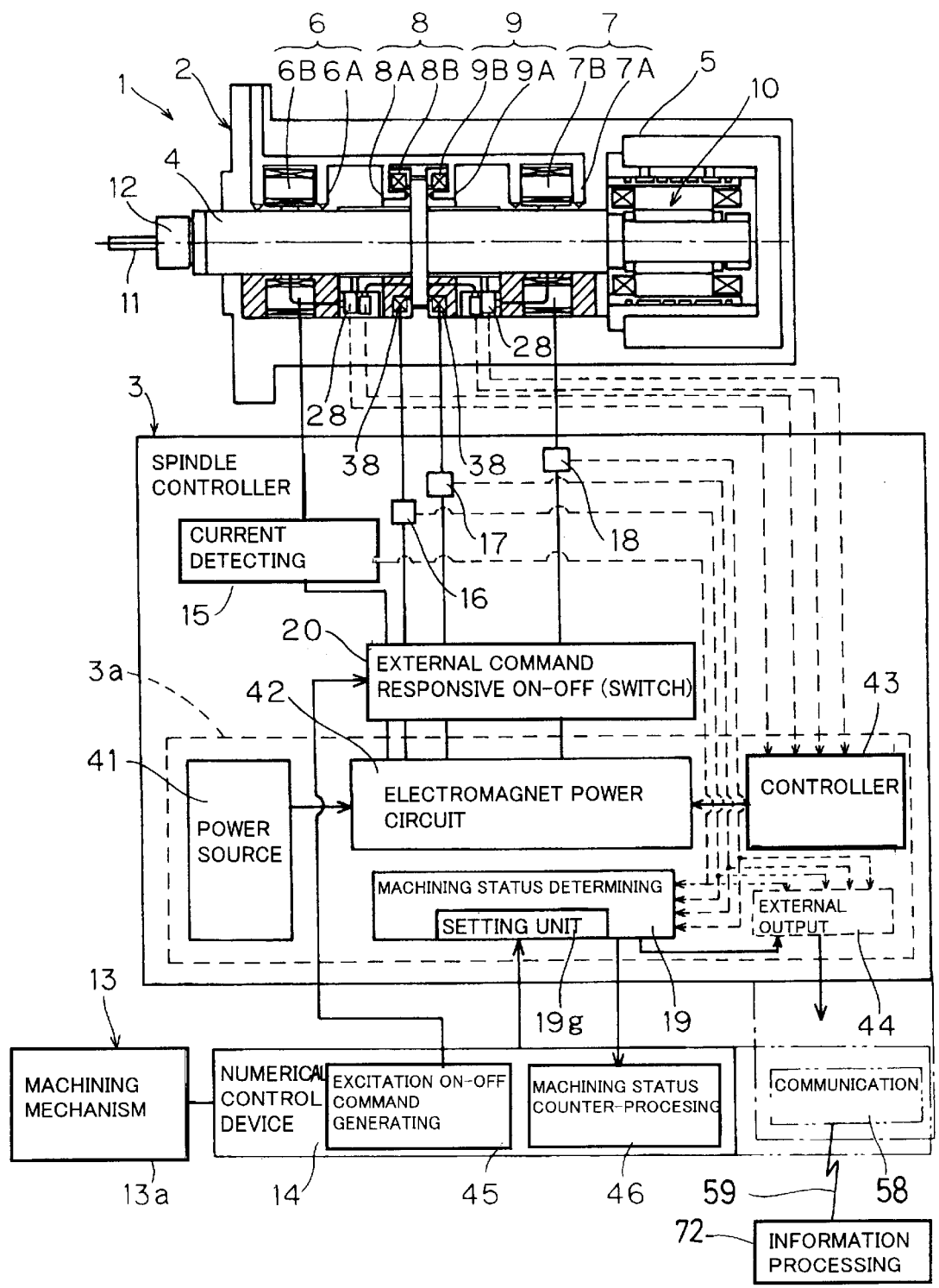
FIG. 1 is a block diagram showing a conceptual configuration of an externally pressurized gas-magnetic bearing spindle device according to a first preferred embodiment of the present invention.

Preferred embodiments of the present invention will now be described with reference to the accompanying drawings. Of them, FIG. 1 illustrates a block diagram showing a conceptual configuration of a spindle device employing a combined externally pressurized gas-magnetic bearing assembly in accordance with a first preferred embodiment of the present invention. In the first place, the outline of the spindle device will be described.

The spindle device 1 shown in FIG. 1 comprises a spindle device main body 2 and a spindle controller 3. The spindle device main body 2 includes a housing 5, a plurality of combined externally pressurized gas-magnetic bearing assemblies 6 and 7 of a radial type, a plurality of combined externally pressurized gas-magnetic bearing assemblies 8 and 9 of an axial type, a main shaft 4 extending in the housing 5 and rotatably supported by the combined externally pressurized gas-magnetic radial and axial bearing assemblies 6 to 9, and a spindle drive source 10 housed within the housing 5. Each of the combined externally pressurized gas-magnetic radial bearing assemblies 6 or 7 is of a design in which an externally pressurized gas bearing 6A or 7A and a magnetic bearing 6B or 7B are combined together whereas each of the combined externally pressurized gas-magnetic axial bearing assemblies 8 or 9 is of a design in which an externally pressurized gas bearing 8A or 9A and a magnetic bearing 8B or 9B are combined together. Any of those combined externally pressurized gas-magnetic radial and axial bearing assemblies 6 to 9 are controlled by a spindle controller 3. The main shaft 4 has a free end extending outwardly from the housing 5 and includes a chuck 12 mounted on the free end of the main shaft 4 for rotation together therewith, which chuck 12 is used to grip a tool 11. A machine tool 13 equipped with the spindle device of the structure described above is controlled by a numerical control device 14.

The spindle controller 3 includes current detecting means 15 to 18 each operable to detect an exciting current supplied to the corresponding magnetic bearing 6B to 9B forming a part of the respective combined externally pressurized gas-magnetic bearing assembly 6 to 9, and a machining status determining means 19 operable to determine the status of machining performed by the tool 11 in reference to the exciting currents detected by the current detecting means 15 to 18. The spindle controller 3 also includes an external command responsive ON-OFF means 20 operable in response to an external command, supplied from the numerical control device 14 and others, to initiate and terminate excitation of the magnetic bearings 6B to 9B.

Figure 2:
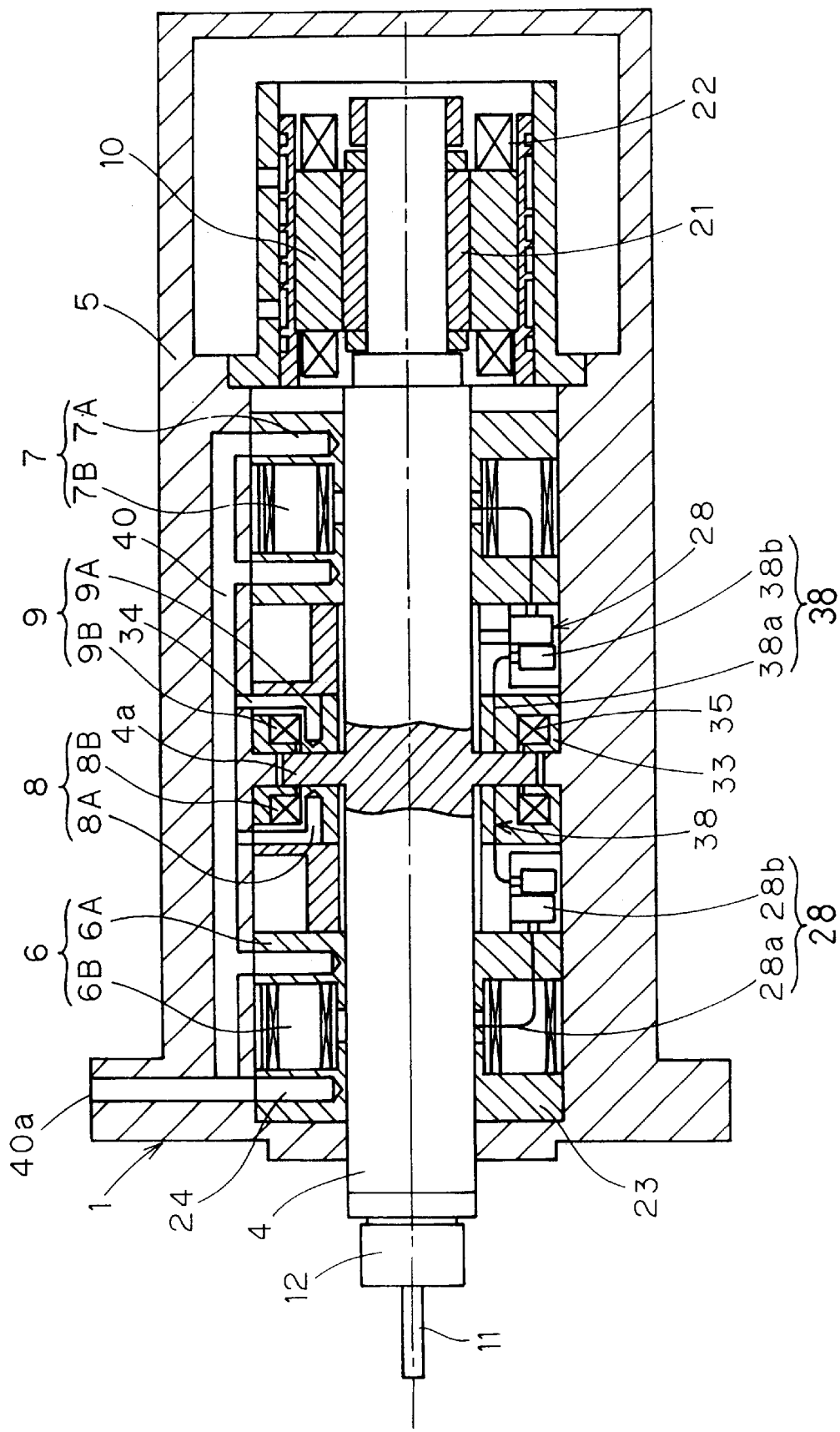
FIG. 2 is a longitudinal sectional view of the spindle device shown in FIG. 1.

The spindle device main body 2 of the spindle device 1 will now be described with particular reference to FIGS. 2 to 5. The spindle device 1 is a spindle device of a built-in motor type for the machining tool 13, and the spindle drive source 10 is disposed within the housing 5 together with the combined externally pressurized gas-magnetic bearing assemblies 6 to 9. The spindle drive source 10 comprised of this built-in motor includes, as shown in FIG. 2, a rotor 21 mounted on the main shaft 4 for rotation together therewith, and a stator 22 fixed to the housing 5 so as to surround the rotor 21. The housing 5 is of a generally cylindrical shape. It is to be noted that without being designed as the built-in type, the spindle drive source 10 may be disposed externally of the housing 5 and drivingly coupled with the main shaft 4 through any suitable drive transmission mechanism.

In the illustrated embodiment, while front and rear end portions of the main shaft 4 adjacent and remote from the tool 11, respectively, are rotatably supported by the combined externally pressurized gas-magnetic radial bearing assemblies 6 and 7 with a generally intermediate portion of the main shaft 4 supported rotatably by the combined externally pressurized gas-magnetic axial bearing assemblies 8 and 9, the spindle drive source 10 is disposed adjacent a rear end of the main shaft 4. However, instead of the disposition of the spindle drive source 10 adjacent the rear end of the main shaft 4, the spindle drive source 10 may be disposed between the combined externally pressurized gas-magnetic radial bearing assemblies 6 and 7 and, in such case, the combined externally pressurized gas-magnetic axial bearing assemblies 8 and 9 may be disposed at any desired location with respect to the main shaft 4. It is to be noted that the combined externally pressurized gas-magnetic axial bearing assemblies 8 and 9 may be of any known type so long as they are a non-contact bearing and, instead of the combined externally pressurized gas-magnetic bearing assemblies, a single magnetic bearing or an externally pressurized gas bearing may be employed.

The combined externally pressurized gas-magnetic radial bearing assemblies 6 and 7 are of an identical structure and, therefore, only one of them, for example, the combined externally pressurized gas-magnetic radial bearing assembly 6 will now be described with reference to FIGS. 3 and 4 which illustrate, on an enlarged scale, a transverse sectional view and a longitudinal sectional views thereof. As described previously, each of the combined externally pressurized gas-magnetic radial bearing assemblies 6 and 7 is of the design in which the externally pressurized gas bearing 6A or 7A and the magnetic bearing 6B or 7B are combined together. Accordingly, the term "combined" used in connection with each of the externally pressurized gas-magnetic bearing assemblies 6 to 9 is intended to means that some of the component parts of the externally pressurized gas bearing are commonly shared by and concurrently serve to form component parts of the mating magnetic bearing, and vice versa. By way of example, the externally pressurized gas bearing and the mating magnetic bearing may have bearing surfaces common to the both (or axially overlapping portions in the case of the radial bearing) or the externally pressurized gas bearing and the mating magnetic bearing may have at least portion thereof commonly shared thereby.

Figure 4:
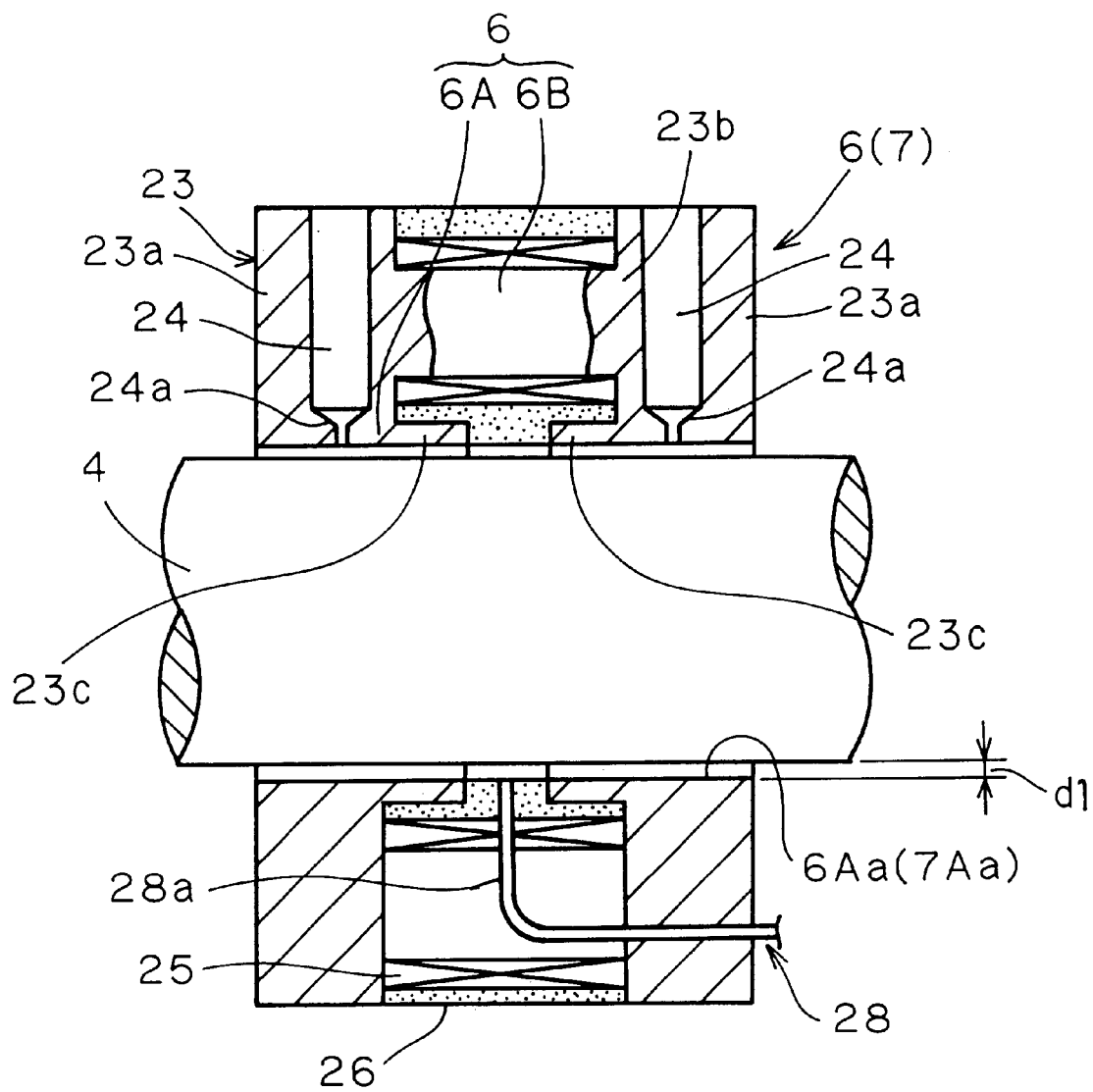
FIG. 4 is a longitudinal sectional view, on an enlarged scale, of a combined externally pressurized gas-magnetic bearing assembly of a radial type.

In the illustrated embodiment, as shown in FIG. 4, the magnetic bearing 6B or 7B has a plurality of electromagnet cores 23 each having orifices 24a defined therein for the mating externally pressurized gas bearing 6A or 7A so as to render the externally pressurized gas bearing 6A or 7A and the mating magnetic bearing 6B or 7B to have commonly shared component parts, and portions of the bearing surfaces thereof are overlapped axially of the main shaft 4. The core 23 forms a portion of each of externally pressurized gas bearing surfaces 6Aa and 7Aa. Each of the electromagnet cores 23 includes a pair of main core portions 23a and 23a spaced axially of the main shaft 4, and axial extensions 23c and 23c extending axially inwardly from the respective main core portions 23a and 23a so as to render the respective electromagnet core 23 to represent a generally C-shaped longitudinal sectional configuration. An inner peripheral surface of each main core portion 23a and an inner peripheral surface of the respective axial extension 23c represent a cylindrical surface that cooperates with the main shaft 4 to defme a predetermined magnetic gap therebetween. The magnetic bearing 6B or 7B is of a design in which a coil 25 is formed around a connecting core portion 23b of the respective electromagnet core 23, which coil 25 is embedded in a non-magnetic body 26 made of, for example, a synthetic resin.

The externally pressurized gas bearing 6A or 7A includes the externally pressurized gas bearing surface 6Aa or 7Aa which is formed by respective inner peripheral surfaces of the respective electromagnet core 23 and the non-magnetic body 26 and cooperates with the main shaft 4 to define a bearing gap d1 between the bearing surface 6Aa or 7Aa and the peripheral surface of the main shaft 4, and an orifice 24a that is defined in each of the main core body 23a and 23a of the respective electromagnet core 23 and opens on the externally pressurized gas bearing surface 6Aa or 7Aa. The orifice 24a is defined at a tip of a gas supply passage 24 opening on an outer peripheral surface of each of the main core portions 23a and 23a.

Figure 3:
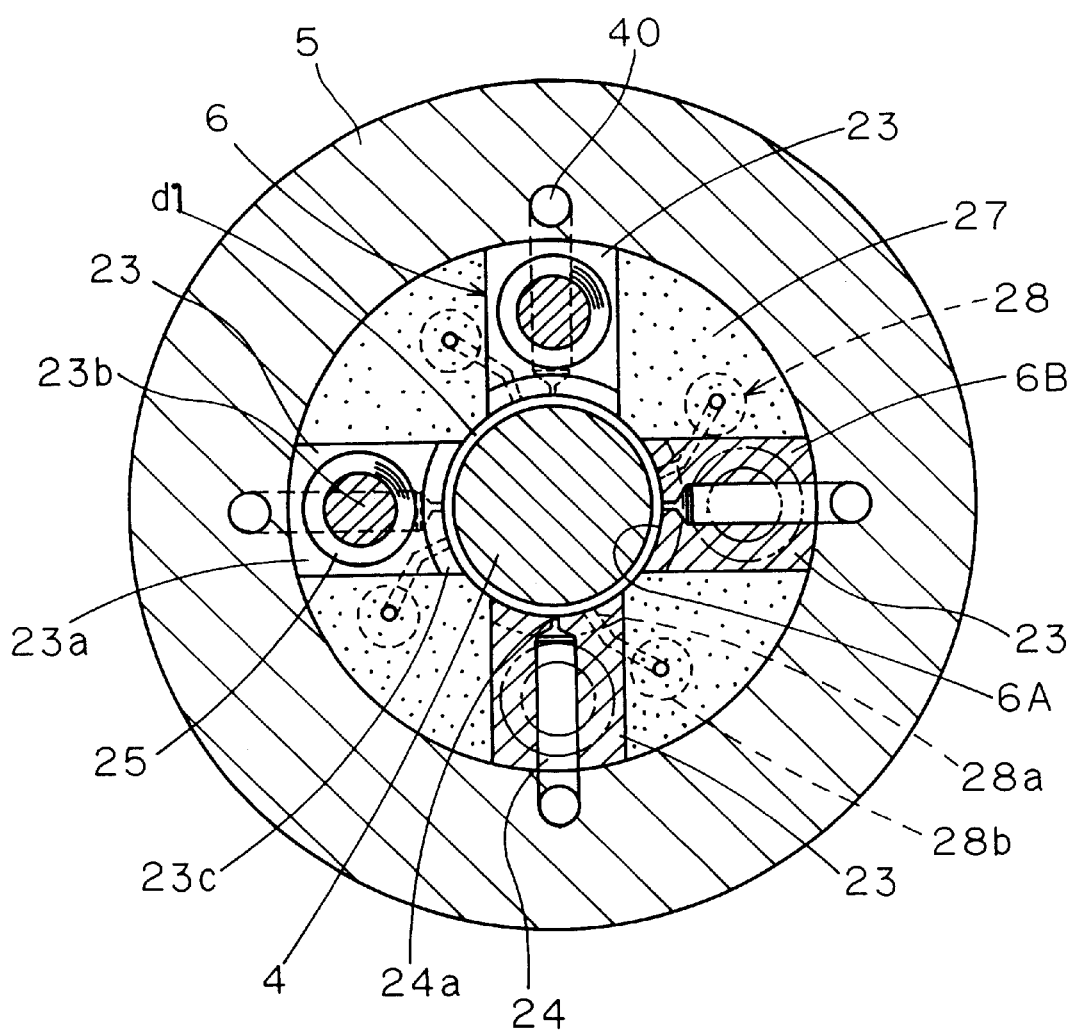
FIG. 3 is a transverse sectional view of the spindle device shown in FIG. 1.

As shown in the transverse sectional representation in FIG. 3, the electromagnet cores 23 are disposed at a plurality, for example, four locations circumferentially around the main shaft 4 and are secured to the housing 5. A space delimited between the neighboring electromagnet cores 23 is filled up with a non-magnetic body 27 made of, for example, a synthetic resin. This non-magnetic body 27 may be an integral part of the non-magnetic body 26 (FIG. 4) filled around the coil 25. These non-magnetic bodies 26 and 27 and the electromagnet cores 23 cooperate with each other to defme the externally pressurized gas-magnetic bearing surface 6Aa or 7Aa.

Each of the magnetic bearings 6B and 7B includes a displacement detecting means 28 for detecting a displacement of the magnetic gap defined between the main shaft 4 and the associated electromagnet core 23. This displacement detecting means 28 may be of a type capable of directly detecting the amount of displacement of the magnetic gap, but in the illustrated embodiment the displacement detecting means 28 is used to detect the static pressure in the corresponding externally pressurized gas bearing gap d1, which pressure is converted into the amount of displacement to thereby accomplish detection of the displacement of the associated magnetic gap. More specifically, the displacement detecting means 28 is made up of a pressure detecting passage 28a having one end opening at and in communication with the corresponding externally pressurized gas bearing gap d1, and a sensor 28b communicated with the pressure detecting passage 28a. The sensor 28b for each displacement detecting means 28 is, as best shown in FIG. 2, disposed at a location spaced axially from the associated electromagnet core 23. The pressure detecting passage 28a for each displacement detecting means 28 is in the form of a thin tube or pipe and is communicated with the externally pressurized gas bearing gap d1 through an opening thereof that is defined in the non-magnetic body 26 between the axial extensions 23c and 23c. Although in FIG. 3 the positions of the respective openings of each orifice 24a and each pressure detecting passage 28a are shown as displaced relative to each other for the sake of clarity, the both are in practice located at the same place with respect to the circumferential direction.

Figure 5:
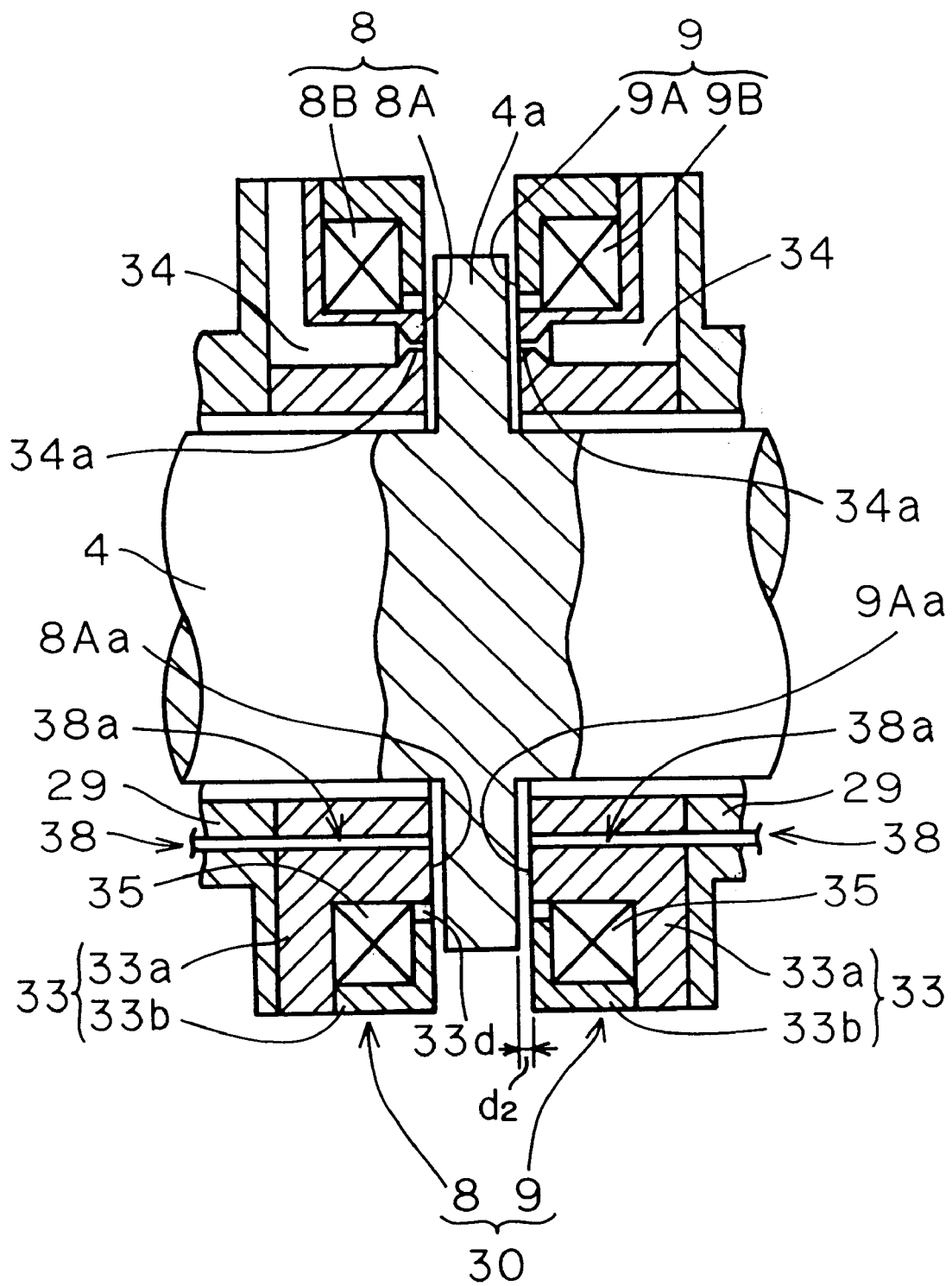
FIG. 5 is a longitudinal sectional view, on an enlarged scale, of a combined externally pressurized gas-magnetic bearing assembly of an axial type.

FIG. 5 illustrates, on an enlarged scale, the combined externally pressurized gas-magnetic axial bearing assemblies 8 and 9. These combined externally pressurized gas-magnetic axial bearing assemblies 8 and 9 are operatively disposed within the housing 5 on respective sides of a radially outwardly protruding collar 4a formed integrally with the main shaft 4 and altogether forms a single double-sided axial type, externally pressurized gas bearing complex 30. These combined externally pressurized gas-magnetic axial bearing assemblies 8 and 9 are of an identical structure, each being of the design in which the externally pressurized gas bearing 8A or 9A and the mating magnetic bearing 8B or 9B are combined together.

In the illustrated embodiment, each of the magnetic bearings 8B and 9B has a plurality of electromagnet cores 33 each having orifices 34a defined therein for the mating externally pressurized gas bearing 8A or 9A so as to render the externally pressurized gas bearing 8A or 9A and the mating magnetic bearing 8B or 9B to have commonly shared component parts and also to have bearing surfaces thereof overlapped with each other axially of the main shaft 4. Each of the electromagnet cores 33 has a generally C-shaped longitudinal section having an opening 33d defined therein so as to confront the collar 4a integral with the main shaft 4 and also has a coil 35 accommodated therein. The opening 33d is filled up by a non-magnetic body. Although in the illustrated embodiment each of the electromagnet cores 33 is made up of a generally L-sectioned inner peripheral core portion 33a and an outer peripheral core portion 33b, the both may be an integral part of the respective electromagnet core 33. A spacer 29 is disposed on one side of and held in contact with each of the electromagnet cores 33 remote from the collar 4a.

Each of the externally pressurized gas axial bearings 8B and 9B includes an externally pressurized gas bearing surface 8Aa or 9Aa defined by end faces of the electromagnet cores 33 so as to define a bearing gap d2 in cooperation with the collar 4a integral with the main shaft 4, and an orifice 34a defined in the respective electromagnet core 33 so as to open on the externally pressurized gas bearing surface 8Aa or 9Aa. The orifice 34a is formed at a tip of a gas supply passage 34 opening on an outer peripheral surface of the respective electromagnet core 33.

Each of the magnetic axial bearings 8B and 9B includes a displacement detecting means 38 for detecting a displacement of the magnetic gap defined between the main shaft collar 4a and the associated electromagnet core 33. Even this displacement detecting means 38 may be of a type capable of directly detecting the amount of displacement of the magnetic gap, but in the illustrated embodiment the displacement detecting means 38 is used to detect the static pressure in the corresponding externally pressurized gas bearing gap d2, which pressure is converted into the amount of displacement to thereby accomplish detection of the displacement of the associated magnetic gap. More specifically, the displacement detecting means 38 is made up of a pressure detecting passage 38a having one end opening at and in communication with the corresponding externally pressurized gas bearing gap d2, and a sensor 38b (FIG. 2) communicated with the pressure detecting passage 38a.

A compressed air or any other suitable compressed gas is supplied to the gas supply passages 24 and 34 of the externally pressurized gas bearings 6A to 9A of the respective combined externally pressurized gas-magnetic bearing assemblies 6 to 9 through a gas inlet 40a by way of a gas supply passage 40 (FIG. 2) defined in the housing 5.

Hereinafter, a control system will be described. As shown in FIG. 1, the spindle controller 3 comprises a controller basic unit 3a including an electric power source 41, an electromagnet power circuit 42 and a control means 43. The electromagnet power circuit 42 serves as a means for applying an electric current, supplied from the electric power source 41, as an exciting current to the magnetic bearings 6B to 9B of the combined externally pressurized gas-magnetic bearing assemblies 6 to 9 under the control of the control means 43 and may be comprised of an electric current amplifying circuit or the like. The control means 43 serves as a means for controlling the exciting current to be supplied to the magnetic bearings 6B to 9B so that the displacement of the main shaft 4 can be restored to a predetermined value (a target value) according to the values detected by the displacement detecting means 28 and 38 in the combined externally pressurized gas-magnetic bearing assemblies 6 to 9. More specifically, this control means 43 generates a control command for the exciting current according to a result of calculation of the detected values of the displacement detecting means 28 and 38 that is performed by an integrating circuit or a proportional integral circuit.

In the illustrated embodiment, the spindle controller 3 of the basis structure as hereinabove described is provided not only with the current detecting means 15 to 18, a machining status determining means 19 and the external command responsive ON-Off means 20, but also with an external output means 44. The numerical control device 14 is provided with an excitation ON-OFF command generating means 45 and a machining status counter-processing means 46. Each of the current detecting means 15 to 18 may be employed in the form of, for example, a current detector.

Figure 6:
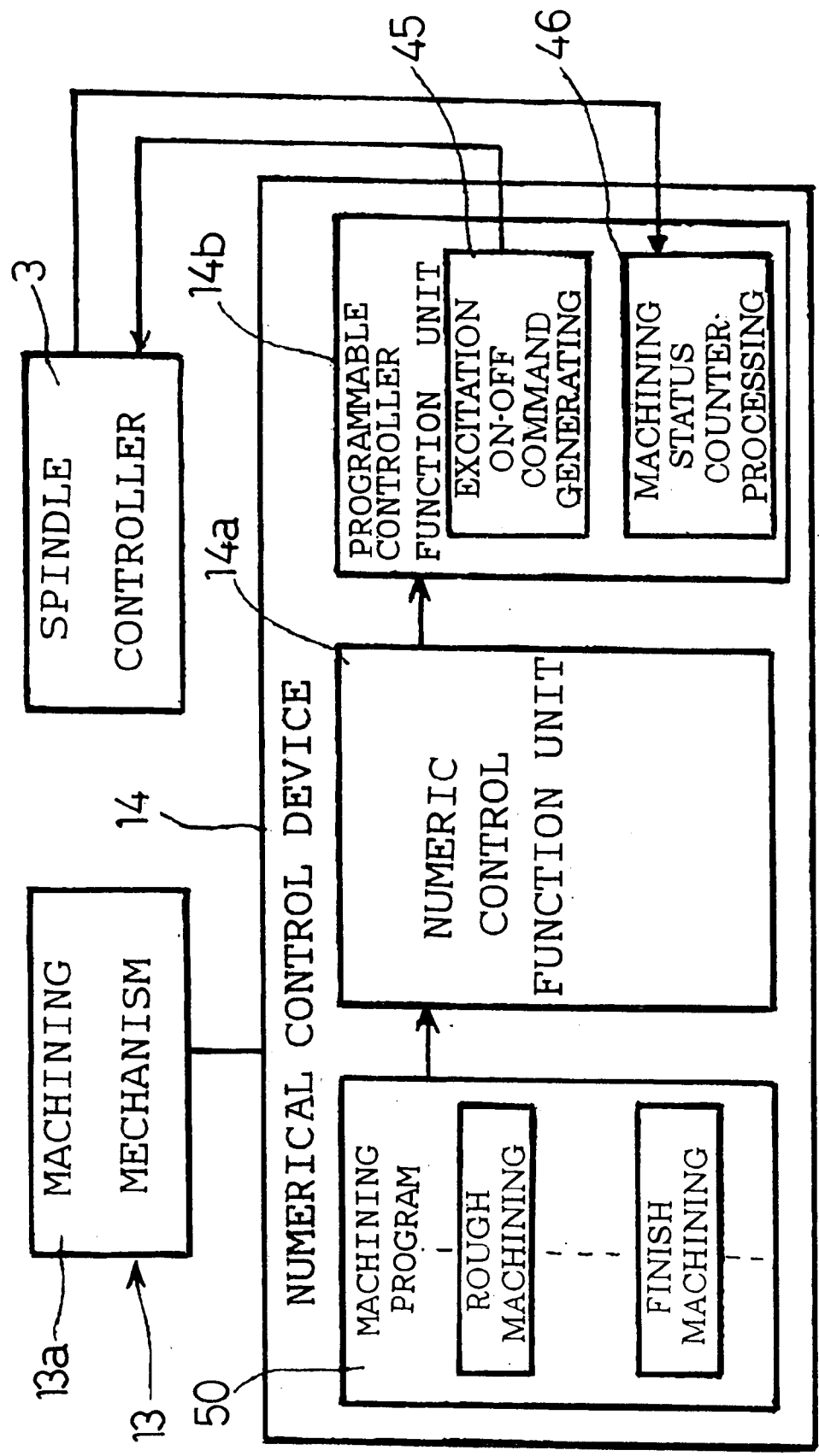
FIG. 6 is a block diagram showing a conceptual configuration of a numerical control apparatus.

As shown in FIG. 6, the numerical control device 14 includes a numerical control function unit 14a and a programmable controller function unit 14b. The numerical control function unit 14a is operable not only to encode a machining program 50 to perform a numerical control of various shafts of a machining mechanism 13a, but also to transfer to the programmable controller function unit 14b a sequence command described in the machining program 50. The programmable controller function unit 14b serves as a means for performing a sequence control of the machining mechanism 13a according to a predetermined sequence program and is provided with the excitation ON-OFF command generating means 45 and the machining status counter-processing means 46 both referred to above.

Figure 8:
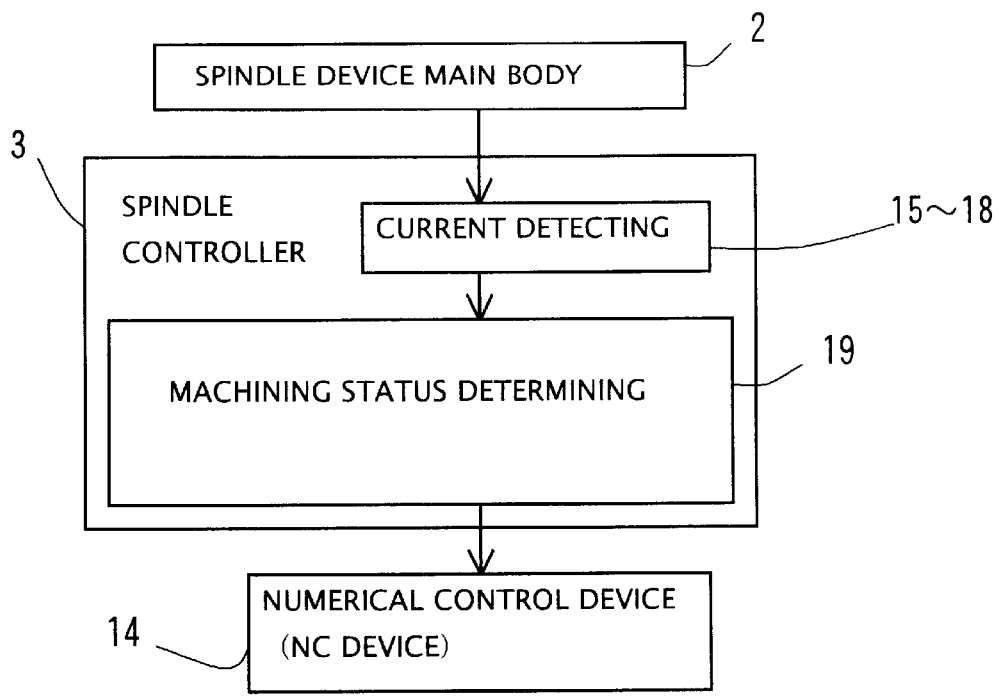
FIG. 8 is a block diagram showing a basic configuration of a machining status determining means.

FIG. 8 illustrates a basic conceptual configuration of the machining status determining means 19. The machining status determining means 19 serves as a means for determining the machining status of the tool 11 in reference to current values detected respectively by the current detecting means 15 to 18 as hereinbefore described and outputs a result of determination to the machining status counter-processing means 46 of the numerical control device 14. The result of determination given by the machining status determining means 19 may be represented by the detected current values themselves, or may be any of a result of comparison of the detected current values with a predetermined value, the detected current values which have been subjected to a predetermined calculation, and a result of comparison of the result of calculation with a predetermined value. Where the control means 43 is of a type capable of controlling the exciting current according to the values which have been detected by the displacement detecting means 28 and 38 as hereinbefore described and which have subsequently calculated by the integrating circuit or the proportional integral circuit, the machining status determining means 19 should be operable to convert the detected current values themselves into a static load of the main shaft 4.

Also, although this machining status determining means 19 is of a type capable of outputting the result of determination of the machining status for each of the current values detected respectively by the current detecting means 15 to 18, the machining status determining means 19 which can be employed in the present invention may be of a type capable of outputting the result of determination of the machining status by determining comprehensively the current values detected respectively by the plural current detecting means 15 to 18, or of a type capable of determining the machining status in reference to one or more of the current values detected respectively by the current detecting means 15 to 18.

Figure 9:
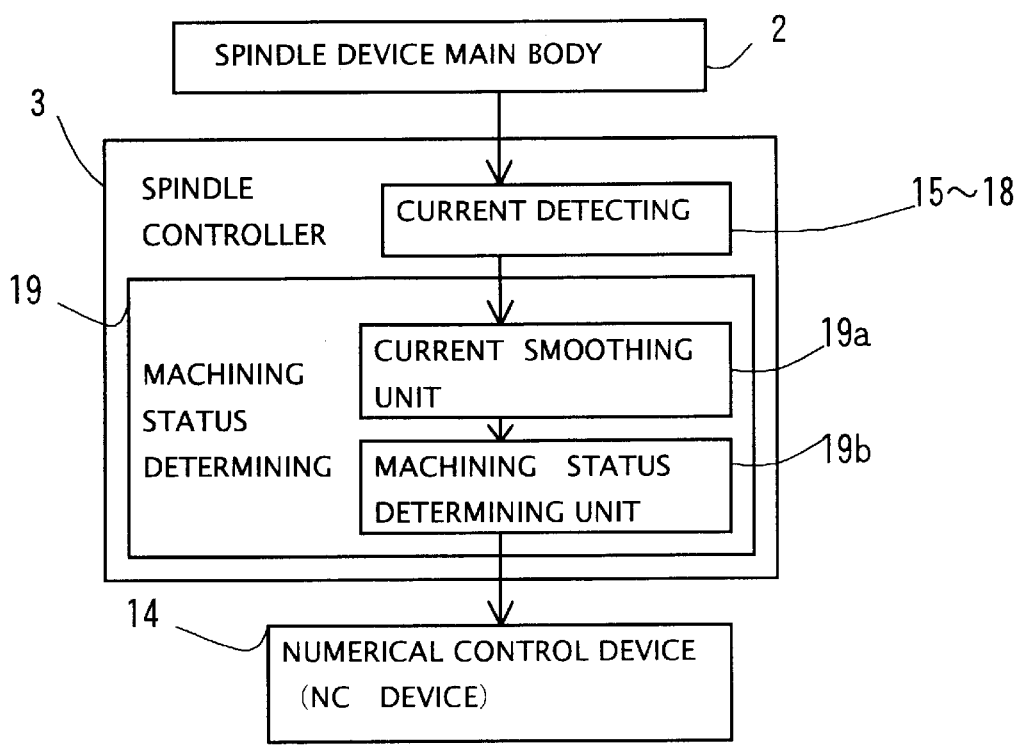
FIG. 9 is a block diagram showing a modified form of the machining status determining means.

FIG. 9 illustrates a specific example of the machining status determining means 19. In this example, the machining status determining means 19 includes a current smoothing unit 19a for smoothing the current value detected by each of the current detecting means 15 to 18, and a machining status determining unit 19b for converting a smoothed value output of the current smoothing unit 19a into the static load of the main shaft 4 and then to determine the machining status in reference to a result of conversion into the static load. The machining status determining unit 19b may be specifically of a type capable of comparing the static load of the main shaft 4 so converted with a predetermined value and outputting an abnormality signal in the event that the converted static load exceeds the predetermined value.

Figure 12:
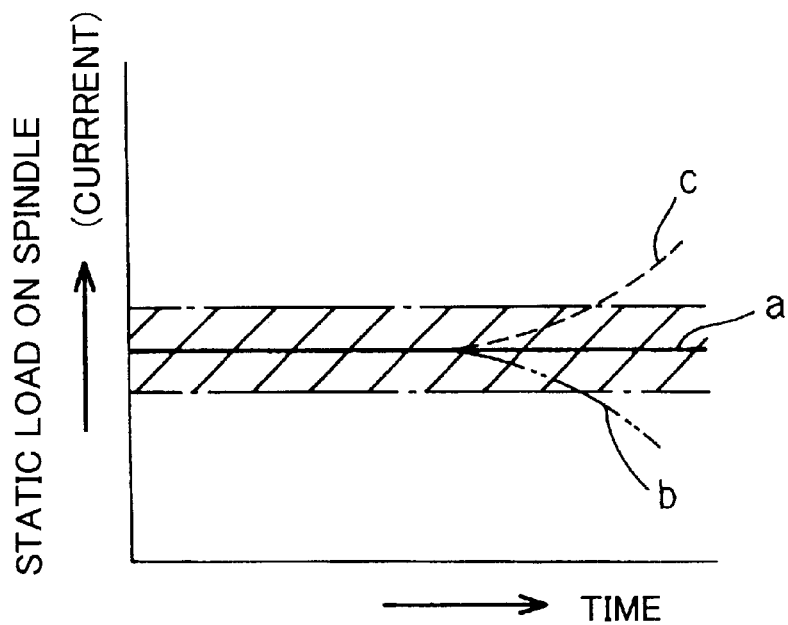
FIG. 12 is a graph showing an example of determination of the machining status by a current smoothing technique.

FIG. 12 illustrates an example of the sequence of operation performed by the machining status determining unit 19b. The static load of the main shaft 4 assumes a constant value as shown by a curve a, provided that a predetermined machining operation continues. In the event that wear of the tool 11 progresses or the tool 11 is damaged, the static load of the main shaft 4 undergoes fluctuation as shown by a curve b or a curve c. In view of this, the predetermined value with which the static load of the main shaft 4 is compared is represented by a tolerance bound between the uppermost and lowermost limits as shown by a hatched area in FIG. 12, such that so long as the static load of the main shaft 4 falls within the tolerance, the tool 11 is deemed normal, but if it deviate from the tolerance as shown by either the curve b or the curve c, the tool 11 is deemed abnormal and, therefore, the abnormality signal is outputted as the result of determination of the machining status. It is to be noted that the wording "the smoothed value output is converted into the static load of the main shaft" is intended to encompass the conversion into units of load and conversion of the smoothed value output in the form of the current value or others into a value that can be easily compared with the predetermined value as the load.

Figure 10:
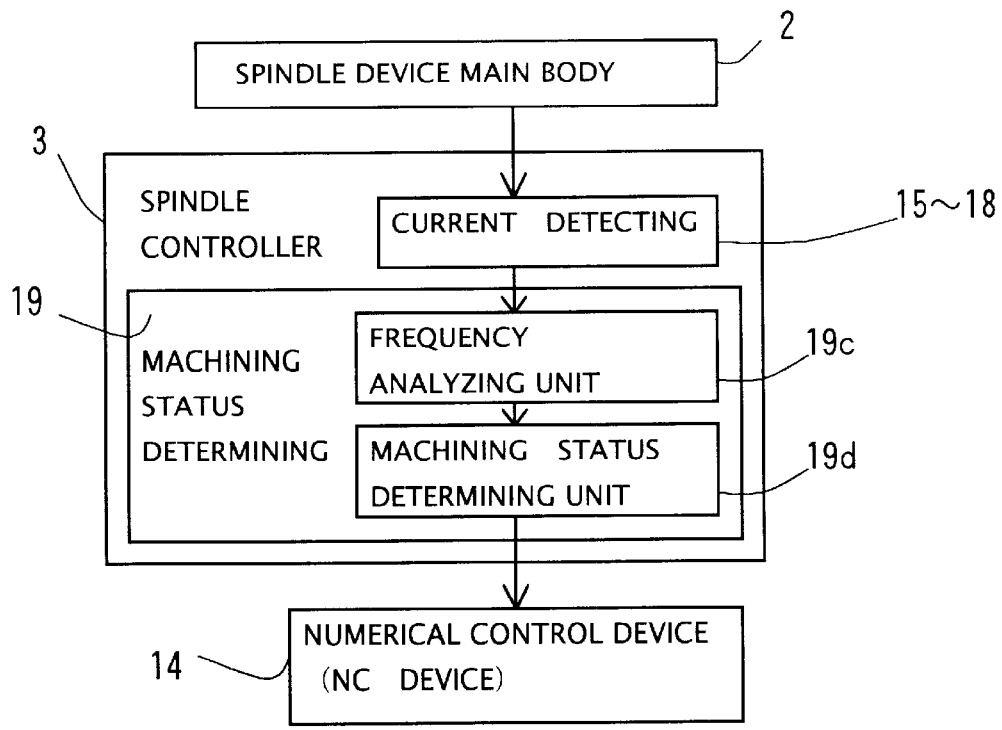
FIG. 10 is a block diagram showing a further modified form of the machining status determining means.

FIG. 10 illustrates another specific example of the machining status determining means 19. In this example, the machining status determining means 19 includes a frequency analyzing unit 19c for analyzing the frequency of the current value detected by each of the current detecting means 15 to 18, and a machining status determining unit 19d for determining the machining status in reference to the amplitude of each of frequency components during the machining that are outputted from the frequency analyzing unit 19c.

Figure 13:
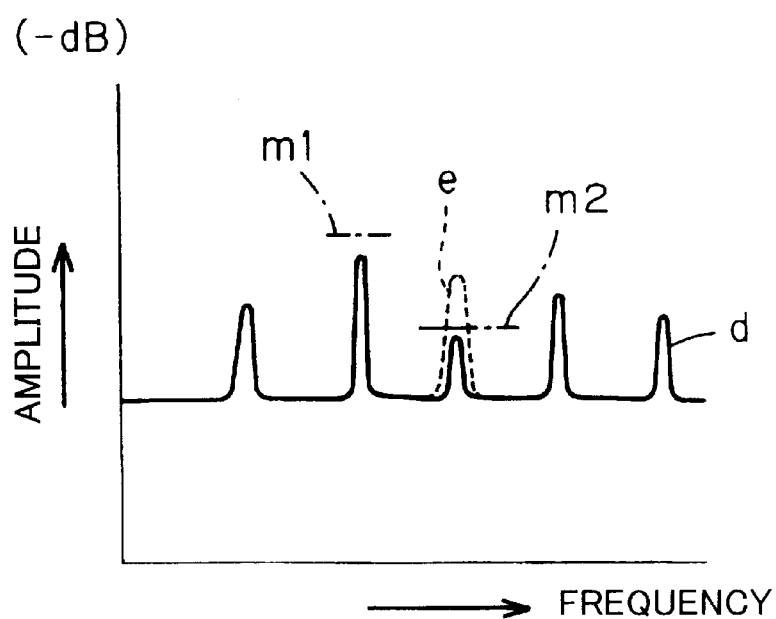
FIG. 13 is a graph showing another example of determination of the machining status by a frequency analysis.

FIG. 13 illustrates an example of the sequence of operation performed by the machining status determining unit 19c. So long as the predetermined machining continues constantly, a result of analysis of the frequency of the detected current value represents a generally constant waveform having a different amplitude for each of the frequency components as shown by a curve d. Accordingly, by determining a predetermined value m1, m2, . . . of amplitude that can be tolerated for each of predetermined frequency regions, the tool 11 can be deemed abnormal only when the amplitude of any of the frequency components exceeds, for example, the predetermined value m2 for the corresponding frequency region as shown by a curve e.

Figure 11:
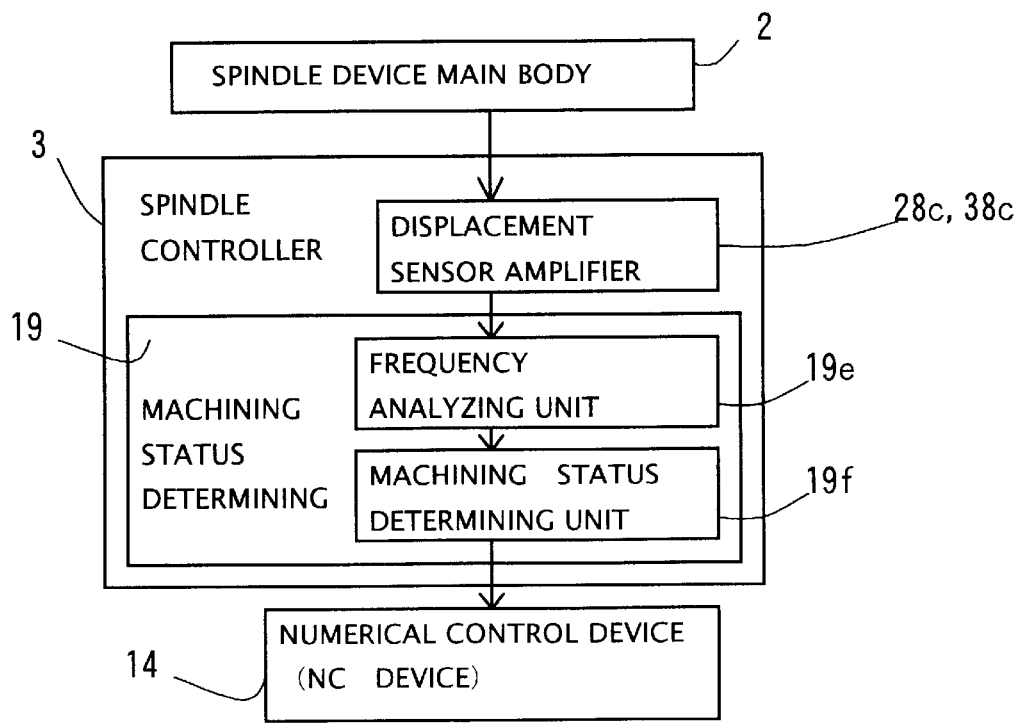
FIG. 11 is a block diagram showing a still further modified form of the machining status determining means.

It is to be noted that although in each of the specific examples, the machining status determining means 19 has been designed to determine the machining status in reference to the current values detected respectively by the current detecting means 15 to 18, the machining status determining means 19 may be of a type capable of determining the machining status in reference to values detected respectively by the displacement detecting means 28 and 38. By way of example, the machining status determining means 19 may include, as shown in FIG. 11, a frequency analyzing unit 19e for frequency-analyzing respective outputs from displacement sensor amplifiers 28c and 38c of the associated displacement detecting means 28 and 38, and a machining status determining unit 19f for determining the machining status in reference to an amplitude of each of frequency components during the machining that are outputted from the frequency analyzing unit 19e.

As shown in FIG. 1, the machining status determining means 19 of any of the structures described hereinbefore includes a setting unit 19g that is utilized where the result of determination of the machining status is outputted as a result of comparison with the predetermined value. This setting unit 19g is variably set with various preset values or is capable of selecting one of a plurality of preset values, in response to a command from the numerical control device 14 or any other means. By way of example, when during the operation of the spindle device 1 machining of a different load such as rough machining or finish machining is carried out, it is necessary that the usability of the tool 11 must be determined with a predetermined value appropriate to the load. The setting unit 19g has the variable predetermined value and can change the predetermined value by detecting a signal incident to change in machining operation of the numerical control device 14.

The external output means 44 serves as a means for outputting to the outside of the spindle controller 3 the current values detected by the current detecting means 15 to 18, a progress or result determined by the machining status determining means 19, for example, the smoothed value output from the current smoothing unit 19a (FIG. 9), or the amplitude values of the various frequency components outputted from the frequency analyzing units 19c and 19e (FIGS. 10 and 11) and others. The numerical control device 14 may be of a type capable of receiving the machining status through this external output means 44, and an output from the external output means 44 may be supplied to an information processing means 72 separate from the numerical control device 14, for example, an information processing means for statistics processing of the machining status.

The machining status counter-processing means 46 provided in the numerical control device 14 is operable in response to an output indicative of the result of determination from the machining status determining means 19, to cause the machining tool 13 to perform a predetermined process such as, for example, generation of a warning, forced halt of the machining tool 13, that is necessitated when the tool 11 fails to operate properly.

The external command responsive ON-OFF means 20 serves as a means for selectively energizing or deenergizing the magnetic bearings 6B to 9B in the combined externally pressurized gas-magnetic bearing assemblies 6 to 9 in response to a command supplied form the outside of the spindle controller 3. Selective energization and deenergization by the external command responsive ON-OFF means 20 may be effected to all of the magnetic bearings 6B to 9B or to some of the magnetic bearings 6B to 9B. In the embodiment shown in FIG. 1, the external command responsive ON-OFF means 20 comprises a switch responsive to a control signal, which switch is interposed in various electric circuit portions connecting the electromagnet power circuit 42 to the magnetic bearings 6B to 9B.

Figure 14:
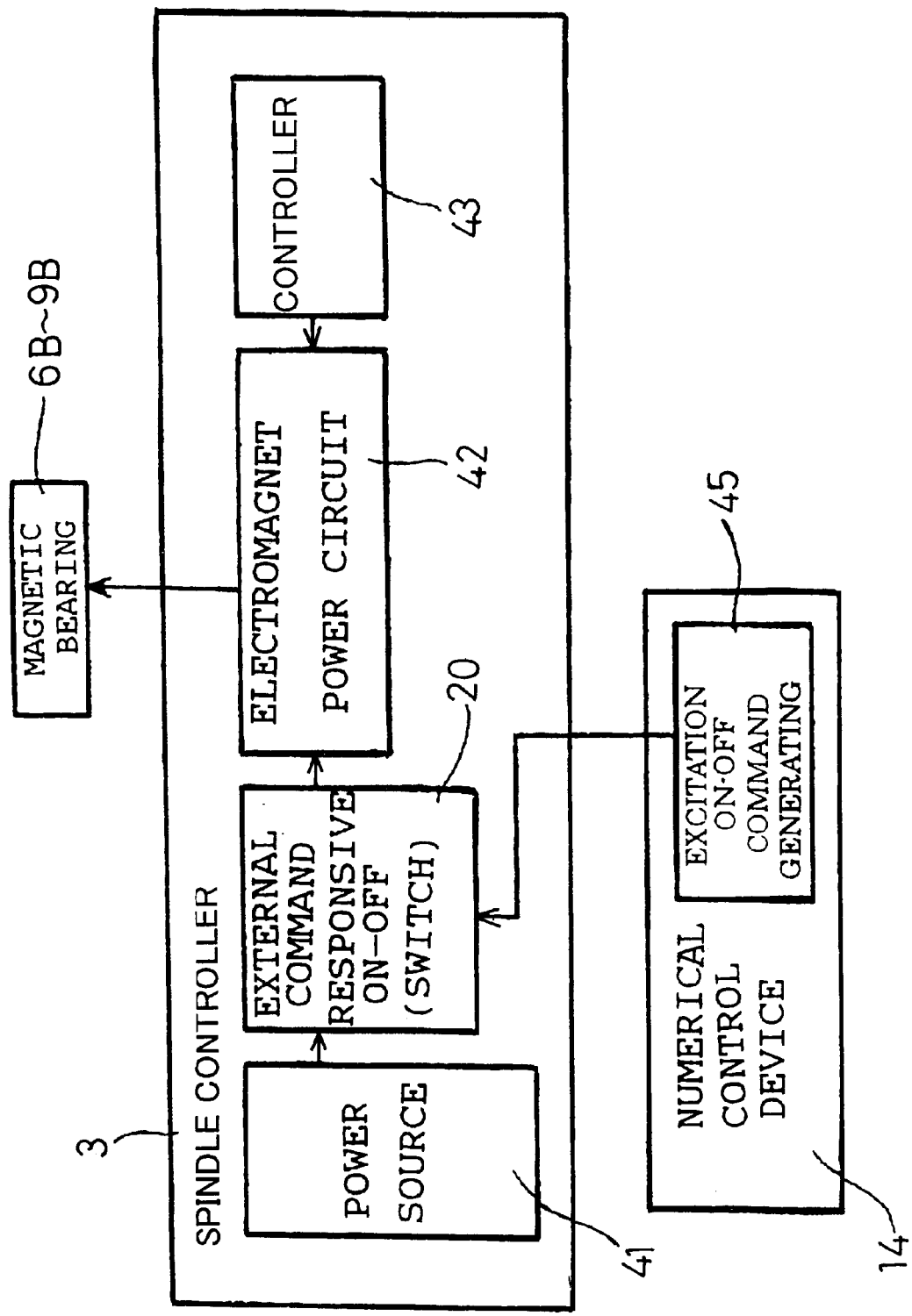
FIG. 14 is a block diagram of a spindle controller showing a different disposition of an external command responsive ON-OFF means.
Figure 15:
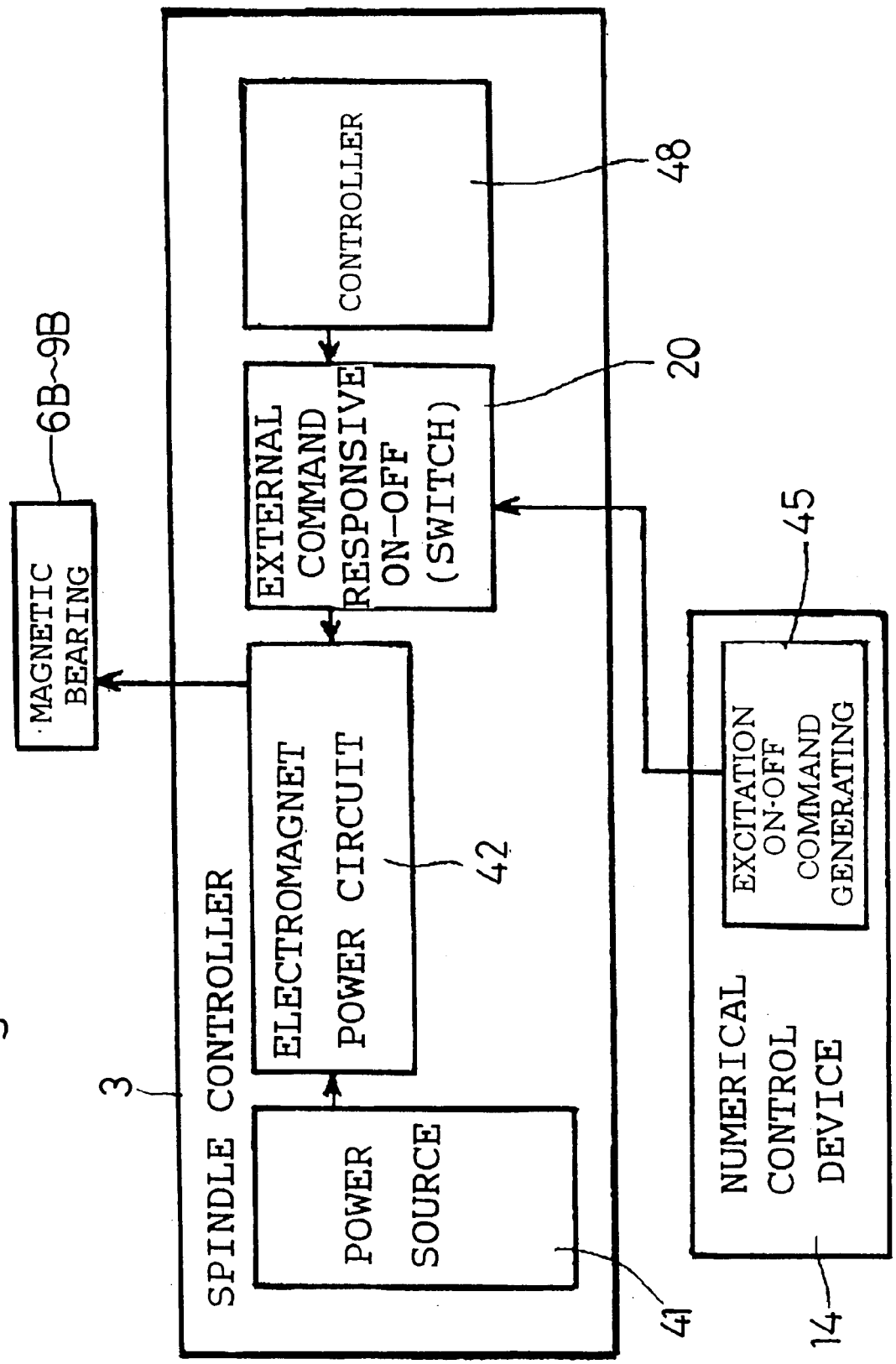
FIG. 15 is a block diagram of a spindle controller showing a further different disposition of an external command responsive ON-OFF means.

The external command responsive ON-OFF means 20 may be disposed between the power source 41 and the electromagnet power circuit 42 as shown in FIG. 14 or between the control means 43 and the electromagnet power circuit 42 as shown in FIG. 15 so that a command required to render the current to be zero can be provided to the electromagnet power circuit 42.

The excitation ON-OFF command generating means 45 of the numerical control device 14 is capable of supplying an ON-OFF command to the external command responsive ON-OFF means 20 in response to a command from the machining program 50 (FIG. 6) according to the progress of the numerically controlled machining operation. In such case, the excitation ON-OFF command generating means 45 generates an excitation ON-OFF command in response to, for example, a predetermined command generated within the numerical control device 14 when a predetermined command of the machining program 50 is decoded or executed by the numerical control device 14. It is to be noted that the ON-OFF command to the external command responsive ON-OFF means 20 may be supplied from an information processing means or the like such as a computer separate from and independent of the numerical control device 14.

Figure 7:
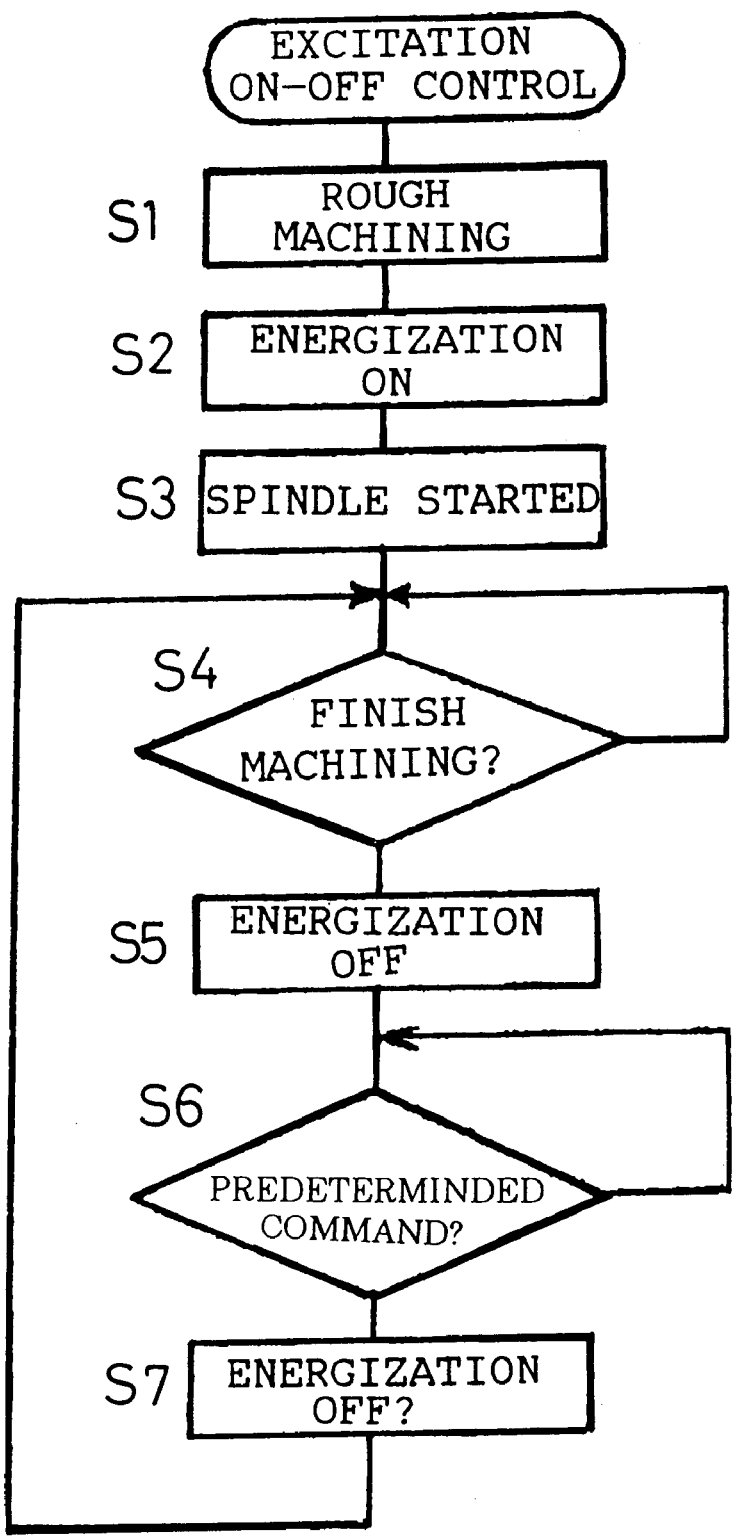
FIG. 7 is a flowchart showing an example of the sequence of control of a magnetic bearing in the combined externally pressurized gas-magnetic bearing assembly.

FIG. 7 illustrates one example of the control that is performed when the machining is carried out by selectively turning the external command responsive ON-OFF means 20 on and off. This example is applied where a finish machining command is available after a rough machining command as is the case with the machining program 50 shown in FIG. 6. At the outset, after energization is turned on at step S2 in response to application of the rough machining command at step S1, the main shaft 4 is started at step S3. In this condition, the combined externally pressurized gas-magnetic bearing assemblies 6 to 9 supports the main shaft 4 rotatably by means of the static pressure and the magnetic force both developed therein. Until before the finish machining command is supplied, the energized condition is maintained at step S4. In the event that the finish machining command is supplied, the energization is turned off at step S5, causing the main shaft 4 to be rotatably supported only by the externally pressurized gas bearings 6A to 9A of the combined externally pressurized gas-magnetic bearing assemblies 6 to 9. Upon termination of the machining or in response to a predetermined command necessary to perform rough machining of, for example, a different part at step S6, the energization is turned on at step S7, causing the main shaft 4 to be rotatably supported by both of the static pressure and the magnetic force.

Thus, by turning the magnetic bearings 6B to 9B on during the rough machining operation and utilizing the externally pressurized gas bearings 6A to 9A during the finish machining operation, a high efficiency can be attained during the rough machining operation and a high precision can be attained during the finish machining operation. Accordingly, a high efficiency, high precision machining can be realized.

Figure 16:
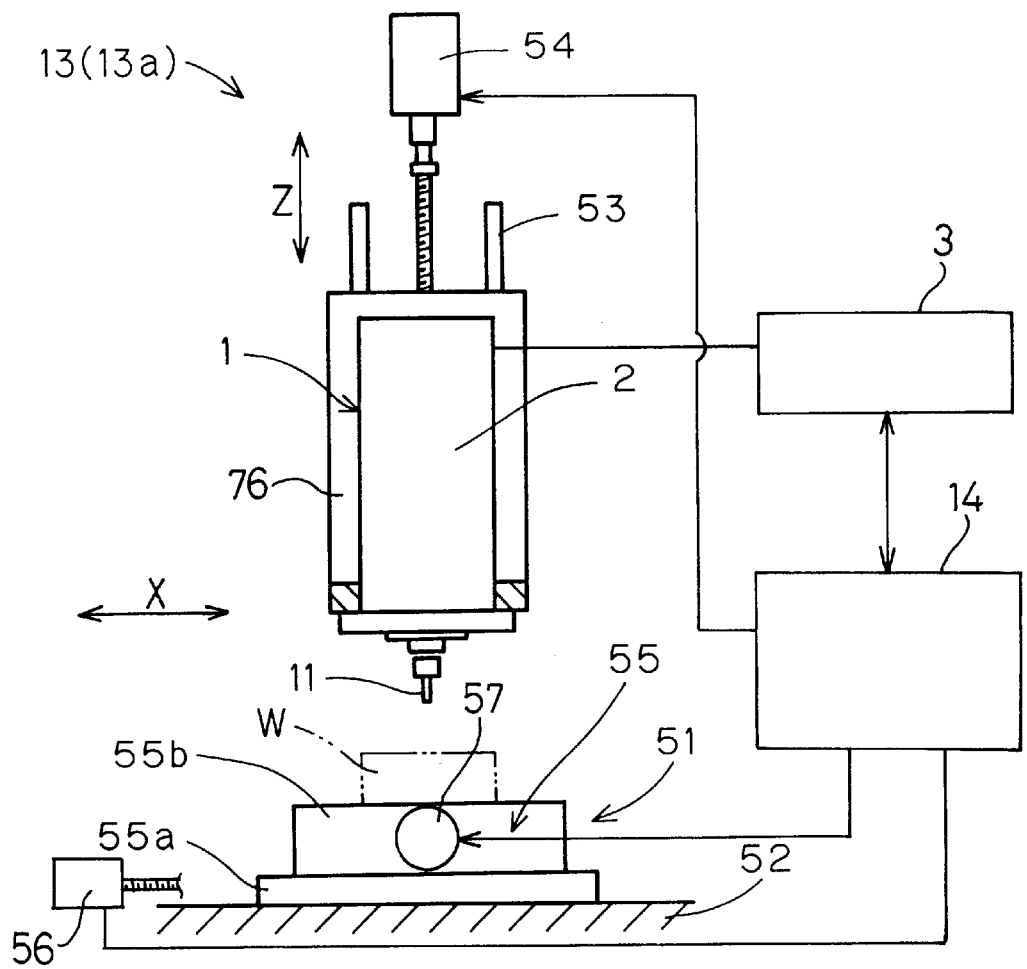
FIG. 16 is a front elevational view of a machining tool equipped with the combined externally pressurized gas-magnetic bearing assembly.
Figure 17:
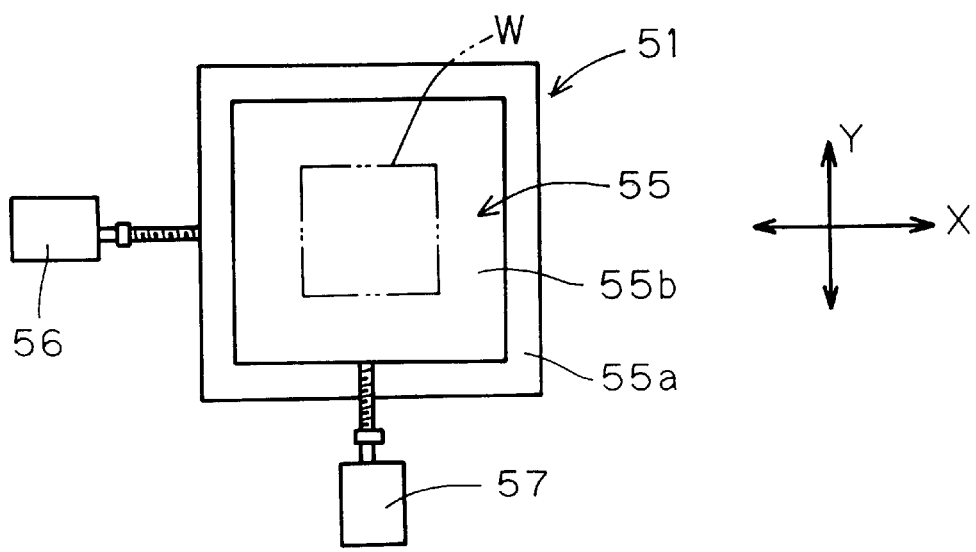
FIG. 17 is a top plan view of a table employed in the machining tool shown in FIG. 16.

FIG. 16 illustrates one example of machining apparatus 13 equipped with the spindle device 1 having the combined externally pressurized gas-magnetic bearing assemblies of the structure hereinbefore described. In this example, the spindle device 1 is applied to a machine tool for machining mold. The spindle device main body 2 of the spindle device 1 is mounted above a table arrangement 51 with the tool 11 oriented downwards and carried by a bench 52 through a guide mechanism 53 for movement up and down in a direction perpendicular to the table arrangement 51. A spindle positioning mechanism 54 serves to move the spindle device main body 2 up and down relative to the table arrangement 51. The table arrangement 51 includes, as shown in FIG. 17, a table unit 55 for the support thereon of a work W to be machined into a mold, which table unit 55 is supported for movement in a horizontal plane in two directions (X-axis and Y-axis directions) perpendicular to each other. Table drive devices 56 and 57 are utilized to drive the table unit 55 in those directions, respectively. The table unit 55 is of a structure including a lower table 55a movable in the X-axis direction and an upper table 55b movably mounted on the lower table 55a for movement in the Y-axis direction relative to the lower table 55a. The X-axis and Y-axis table drive devices 56 and 57 and the spindle positioning mechanism 54 are comprised of a ball screw and a servomotor. In the illustrated embodiment, the direction in which the spindle axis extends, i.e., the Z-axis direction lies in a vertical direction while the directions, i.e., the X-axis and Y-axis directions, in which the table unit 51 is movable lie in a horizontal plane, but the Z-axis direction in which the spindle axis extends may lie in a horizontal direction or an inclined direction while the X-axis and Y-axis directions may lie in respective directions in a vertical plane.

A communication system will now be described in detail. As shown in FIG. 1, the spindle device 1 also includes a communication means 58 disposed within or separate from the spindle controller 3 for communicating a remote information processing means 72 through a communication network 59 such as, for example, a telephone network. This communication means 58 may be a part of the external output means 44 or may be disposed in either the numerical control device 14 or an information processing means (not shown) or the like which serves as a host control computer for the numerical control device 14.

The communication means 58 is capable of communicating any of the amplitude values of the respective frequency components outputted from the frequency analyzing units 19c and 19e (FIGS. 10 and 11), an output from the processing status determining means 19 of the spindle device 1, the detected current values from the current detecting means 15 to 18 and the smoothed value output from the current smoothing unit 19a (FIG. 9). The remote information processing means 72 has a function of performing a predetermined process on information communicated from the communication means 58. This predetermined process may include, for example, a statistics processing of the machining status and generation of a command necessary to control the spindle controller 3 or the numerical control device 14.

The remote information processing means 72 also has a function of applying an ON-OFF command to the external command responsive ON-OFF means 20 of the spindle controller 3. Transmission of the ON-OFF command from the information processing means 72 to the external command responsive ON-OFF means 20 may be carried out through the numerical control device 14 or the information processing means (not shown) which serves as the host control computer for the numerical control device 14.

Figure 18:
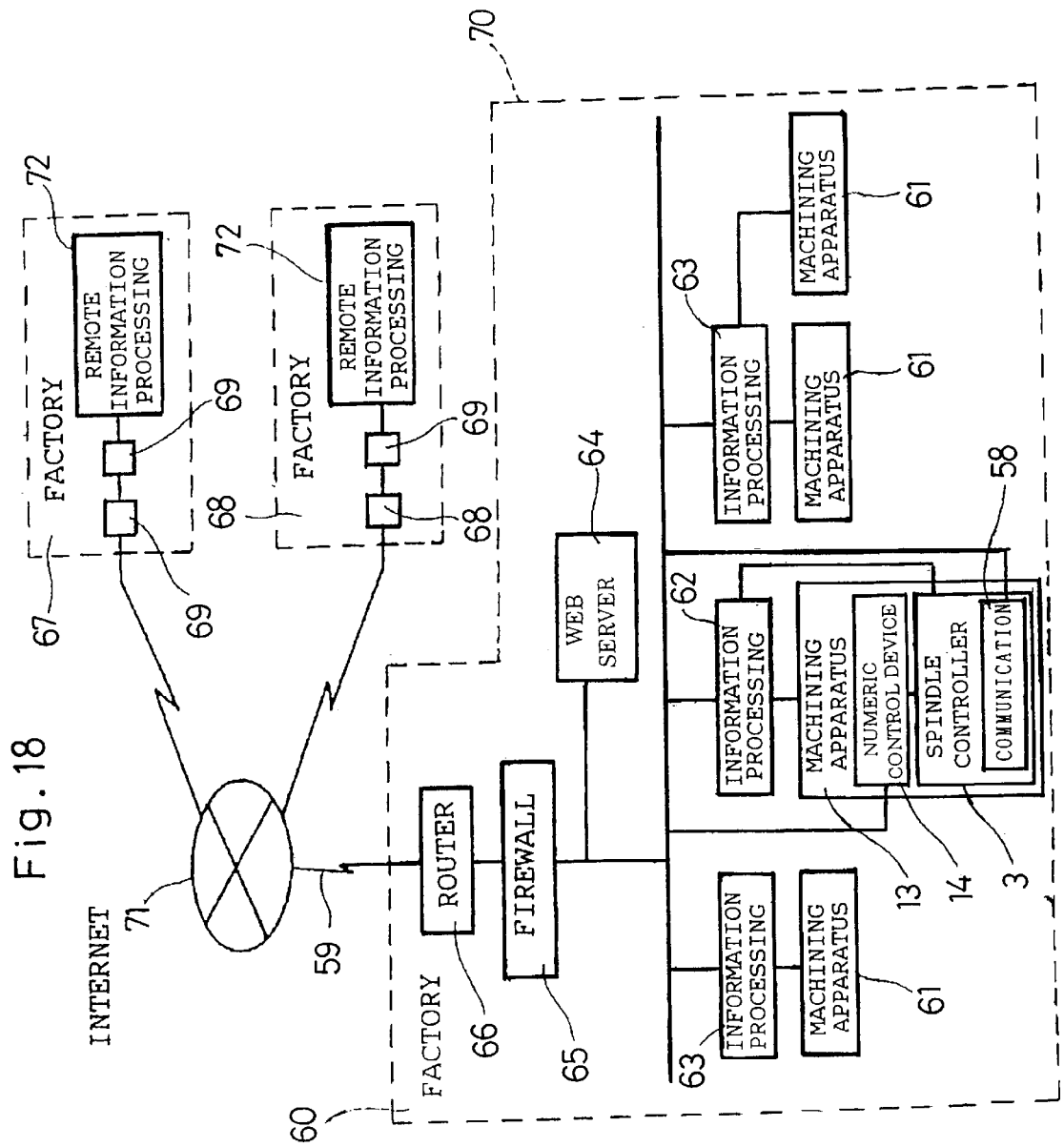
FIG. 18 is a block diagram showing a conceptual configuration of the spindle device utilizing the combined externally pressurized gas-magnetic bearing assembly and capable of being remote controlled or monitored.

FIG. 18 illustrates an example of how communication is developed by the machining apparatus 13 equipped with the spindle device 1. A factory 60 where the machining apparatus 13 is installed is provided with a plurality of machining apparatuses 61. The machining apparatuses 13 and 61 are individually or collectively connected with common information processing means 62 and 63. The information processing means 62 and 63 constitute a local area network 70 together with a network components including a web server 64, a firewall 65 and a router 66. This local area network 70 is connected through an internet by means of a communication line 59 with communication instruments 69 installed in respective remote factories 67 and 68 encompassed by the local area network, which communication instruments 69 are in turn connected with the remote information processing means 72 in the respective factories 67 and 68.

In general, the machining apparatus 13 includes the numerical control device 14 connected with the information processing means 62 which is in turn connected with the communication line within the local area network 70. However, in combination therewith or separately therefrom, the machining apparatus 13 may include a communication system connected with the communication line within the local area network 70 that is directly connected with the communication means 58 provided in the numerical control device 14 or the spindle controller 3.

Figure 19:
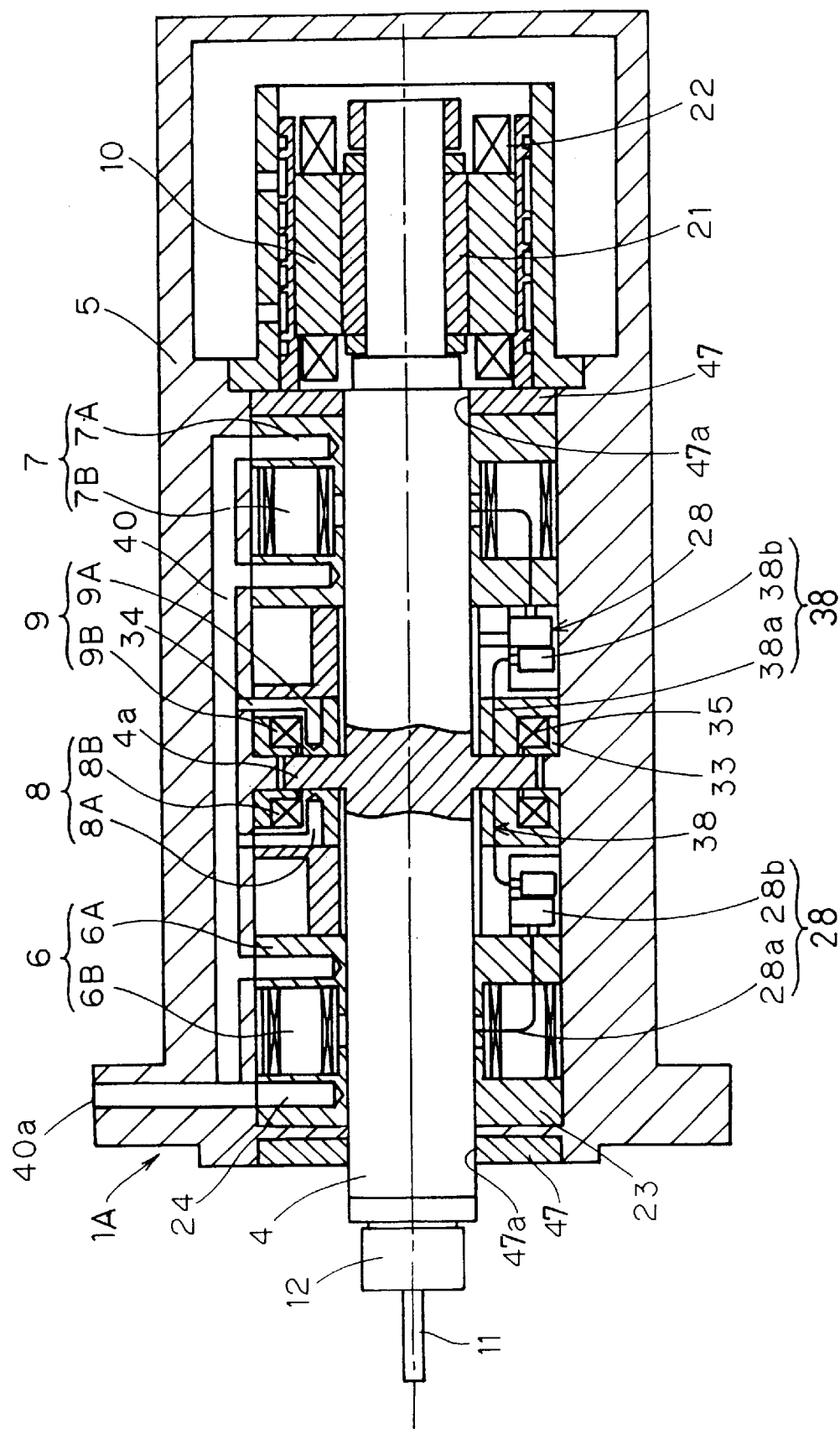
FIG. 19 is a longitudinal sectional view of the spindle device according to a second preferred embodiment of the present invention.
Figure 20:
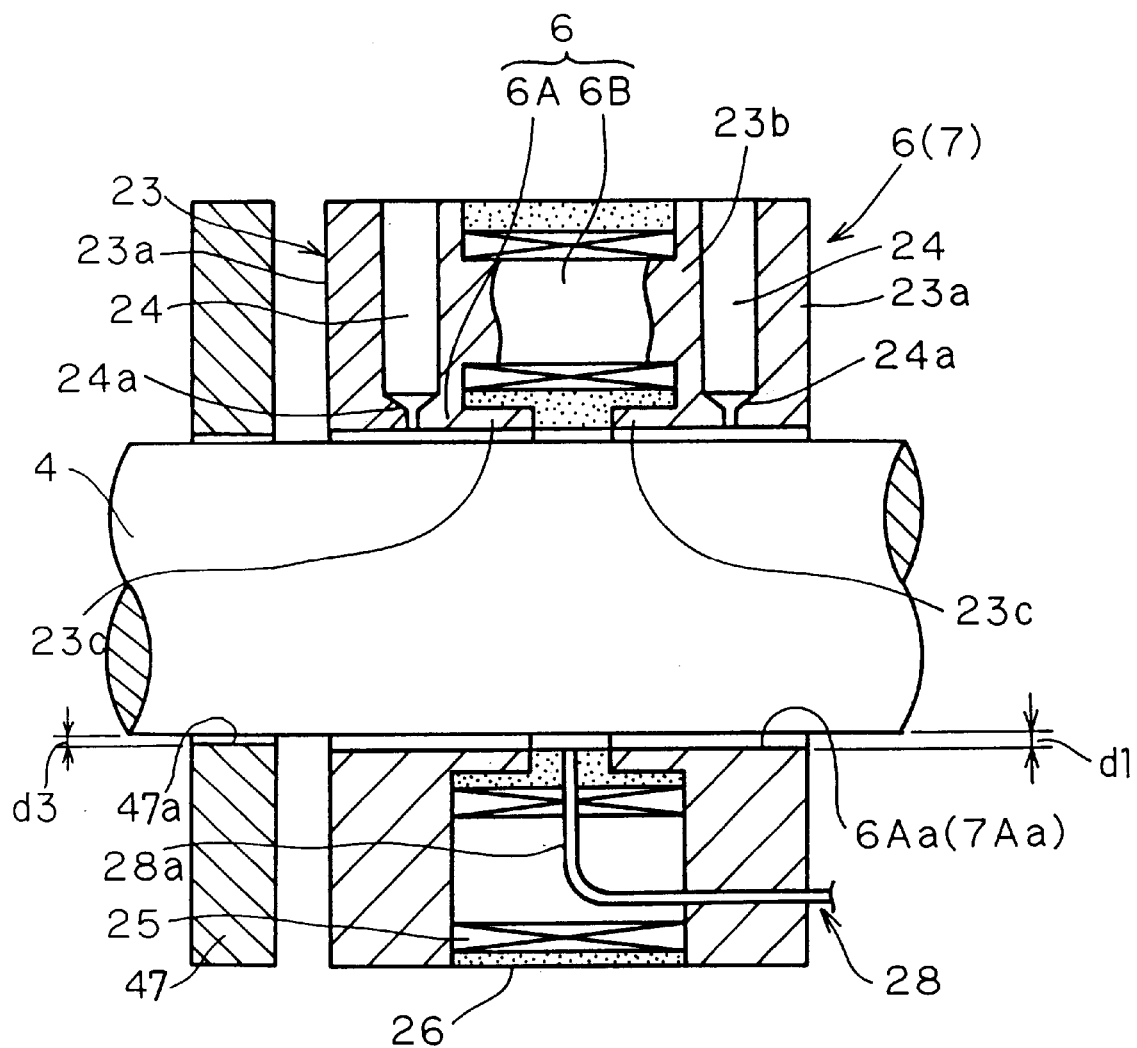
FIG. 20 is a longitudinal sectional view, on an enlarged scale, of the combined externally pressurized gas-magnetic bearing assembly of the radial type employed in the spindle device shown in FIG. 19.

Referring now to FIGS. 19 and 20, reference is made to the spindle device 1A equipped with the combined externally pressurized gas-magnetic bearing assemblies in accordance with a second preferred embodiment of the present invention. It is to be noted that component parts of the spindle device 1A that are alike those employed in the spindle device 1 of the foregoing embodiment shown particularly in FIGS. 2 to 4 are shown by like reference numerals.

In the second embodiment shown in FIGS. 19 and 20, a slide member 47 having an inner peripheral surface positioned adjacent the main shaft 4 through a radial gap is disposed within the housing 5. This slide member 47 is disposed adjacent each of front and rear ends of the main shaft 4 with the combined externally pressurized gas-magnetic radial bearing assemblies 6 and 7 intervening therebetween. Each of the slide members 47 is in the form of a ring member and is mounted in a slide member mount formed within the housing 5. Each of the slide members 47 has an inner peripheral surface 47a of a cylindrical shape that cooperates with the outer peripheral surface of the main shaft 4 to define a radial gap d3 as shown in FIG. 20. This radial gap d3 is of a size smaller than the bearing gap d1 between the outer peripheral surface of the main shaft 4 and any of the externally pressurized gas bearings 6A or 7A and the magnetic bearings 6B or 7B both forming respective parts of the combined externally pressurized gas-magnetic radial bearing assemblies 6 and 7. Each of the slide members 47 is preferably made of carbon or graphite and has a Shore hardness of not smaller than 50, a bending strength of not smaller than 400 Kg/cm$^2$, a compressive strength of not smaller than 700 Kgf/cm$^2$ and a coefficient of thermal expansion of not greater than $5 \times 10^{-6}$.

In the spindle device 1A of the structure described above, the provision has been made of the slide members 47 adjacent the main shaft 4 and the radial gap d3 (FIG. 20) is chosen to have a size smaller than the radial bearing gap d1 in the externally pressurized gas bearing surfaces 6Aa and 7Aa of the combined externally pressurized gas-magnetic radial bearing assemblies 6 and 7. Accordingly, even when a mechanical contact tends to occur between the main shaft 4 and a member on a stationary side as a result of application of an excessive load to the main shaft 4, such mechanical contact takes place between the slide members 47 and the main shaft 4. Also, since the slide members 47 are made of carbon or graphite, the frictional coefficient is small. For these reasons, the spindle device 1A according to the second embodiment of the present invention is advantageous in that even the mechanical contact will not bring about any damage to any of the main shaft 4, the bearing surfaces 6A*a* and 7A*a* and the slide members 47.

Also, since the externally pressurized gas bearing surfaces 6A*a* and 7A*a* are defined by the respective cores 23 of the magnetic bearings 6B and 7B, the bearing structure can advantageously be simplified, but material for the externally pressurized gas bearing surfaces 6A*a* and 7A*a* is limited to a ferromagnetic metal having no lubricating capability and, therefore, it is important to avoid any possible contact with the main shaft 4. For this reason, the use of the slide members 47 is effective to avoid any possible damage to the main shaft 4.

In addition, since the slide members 47 are disposed adjacent the opposite ends of the main shaft 4 rather than in the arrangement of the combined externally pressurized gas-magnetic bearing assemblies 6 and 7, a tendency of the main shaft 4 to tilt under the influence of an excessive radial load can be effectively counteracted and, hence, supported by the slide members 47 to thereby avoid an undesirable contact of the main shaft 4 with the bearing surfaces 6A*a* and 7A*a*. The slide members 47 have a Shore hardness of not smaller than 50, a bending strength of not smaller than 400 Kgf/cm$^2$, a compressive strength of not smaller than 700 Kgf/cm$^2$ and a coefficient of thermal expansion of not greater than $5 \times 10^{-6}$, and with the use of the specific material for the slide members 47 having such a hardness, bending strength and a compressive strength, any possible damage to the slide members 47 which would be brought about by contact with the main shaft 4 can advantageously be avoided. Also, selection of the coefficient of thermal expansion of the slide members 47 within the specific range described above is advantageous in that it becomes equal to or smaller than the coefficient of thermal expansion of a soft magnetizable metal generally used as a material for the cores 23 of the magnetic bearings 6B and 7B of the combined externally pressurized gas-magnetic bearing assemblies 6 and 7 and, therefore, expansion of the inner diameter of the slide members 47 as a result of thermal expansion will become equal to or smaller than that of the cores 23. For this reason, even when an excessive load acts on the main shaft 4 during increase of temperature, it is effectively received by the slide members 47. The carbon or graphite used as material for the slide members 47 can be of a kind effective to satisfy the above described requirements.

Figure 21:
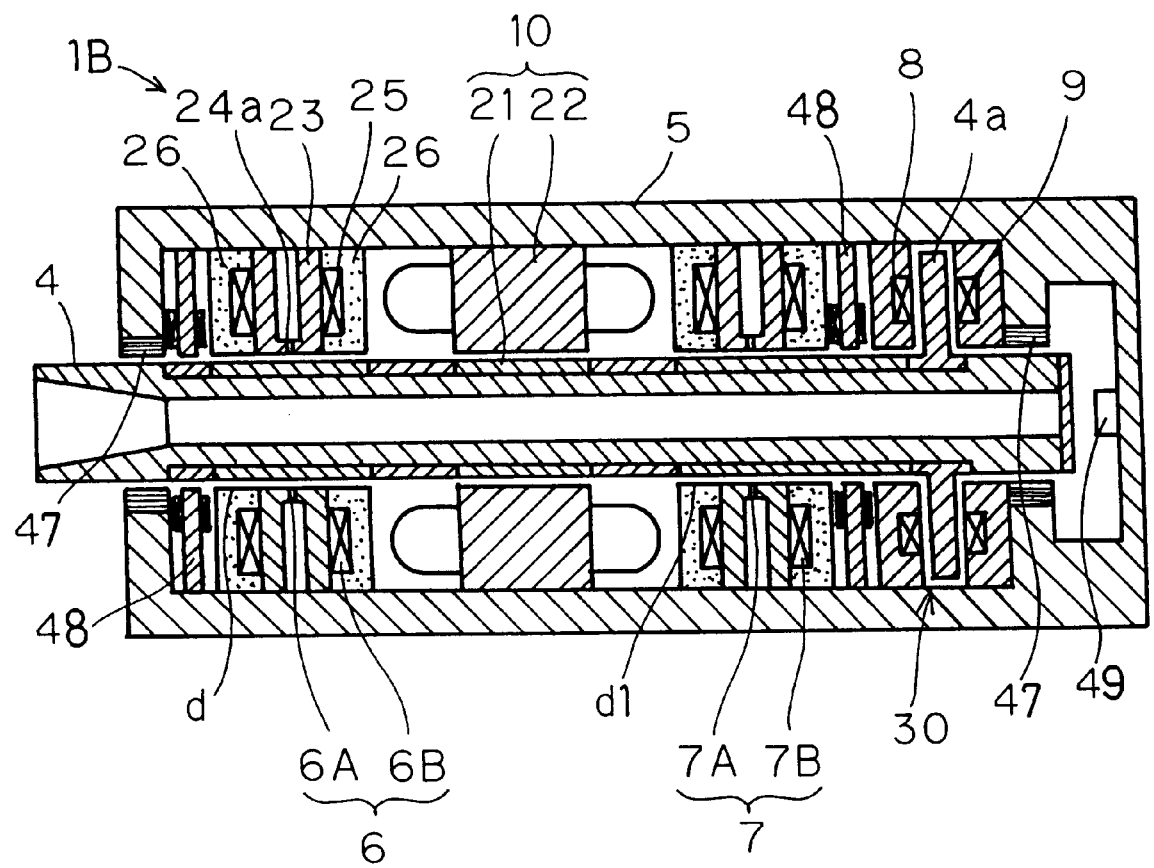
FIG. 21 is a longitudinal sectional view of the spindle device according to a third preferred embodiment of the present invention.

FIG. 21 illustrates the spindle device 1B equipped with the combined externally pressurized gas-magnetic bearing assemblies according to a third preferred embodiment of the present invention. It is to be noted that component parts of the spindle device 1B that are alike those employed in the spindle device of the foregoing embodiment shown particularly in FIG. 19 are shown by like reference numerals.

In the third embodiment, the spindle drive source 10 is disposed intermediate between the front and rear combined externally pressurized gas-magnetic radial bearing assemblies 6 and 7 that rotatably support the main shaft 4 and the combined externally pressurized gas-magnetic axial bearing assemblies 8 and 9 are disposed around the main shaft 4 on one side of the rear combined externally pressurized gas-magnetic bearing assembly 7 adjacent the end of the main shaft 4. The slide members 47 are disposed within the housing 5 on respective side of the array of the combined externally pressurized gas-magnetic bearing assemblies 6 to 9 and adjacent the opposite ends of the main shaft 4, respectively. Also, in the third embodiment shown in FIG. 21, the displacement detecting means 48 and 49 of the combined externally pressurized gas-magnetic bearing assemblies 6 to 9 are employed in the form of a magnetic detector for magnetically detecting the displacement of the main shaft 4, such as an eddy current sensor.

While the specific structure of each of the combined externally pressurized gas-magnetic bearing assemblies 6 to 9 employed in the practice of the third embodiment differs from those employed in the foregoing embodiment shown in FIG. 19, any of the combined externally pressurized gas-magnetic bearing assemblies 6 to 9 in FIGS. 19 and 20 is of a design in which the externally pressurized gas bearings 6A to 9A and the magnetic bearings 6B to 9B are combined together and, at the same time, the electromagnet cores 23 and 33 of the magnetic bearings 6B to 9B are utilized to form respective parts of the externally pressurized gas bearing surfaces.

In any event, even in the embodiment shown in FIG. 21, the relationship between the radial gaps, defined by the slide members 47, and the radial gaps defined by the combined externally pressurized gas-magnetic radial bearing assemblies 6 and 7 and the type of material for the slide members 47 remain the same as those discussed in connection with the foregoing embodiment shown in FIG. 19.

It is to be noted that although in any one of the foregoing embodiments discussed hereinbefore, the radial gaps defined by the externally pressurized gas bearings 6A and 7A of the combined externally pressurized gas-magnetic radial bearing assemblies 6 and 7 have been shown to be the same as the radial gaps defined by the magnetic bearings 6B and 7B, the both may differ from each other. In such case, the radial gap defined by the slide members 47 may be further smaller than the smaller radial gaps.

Figure 22:
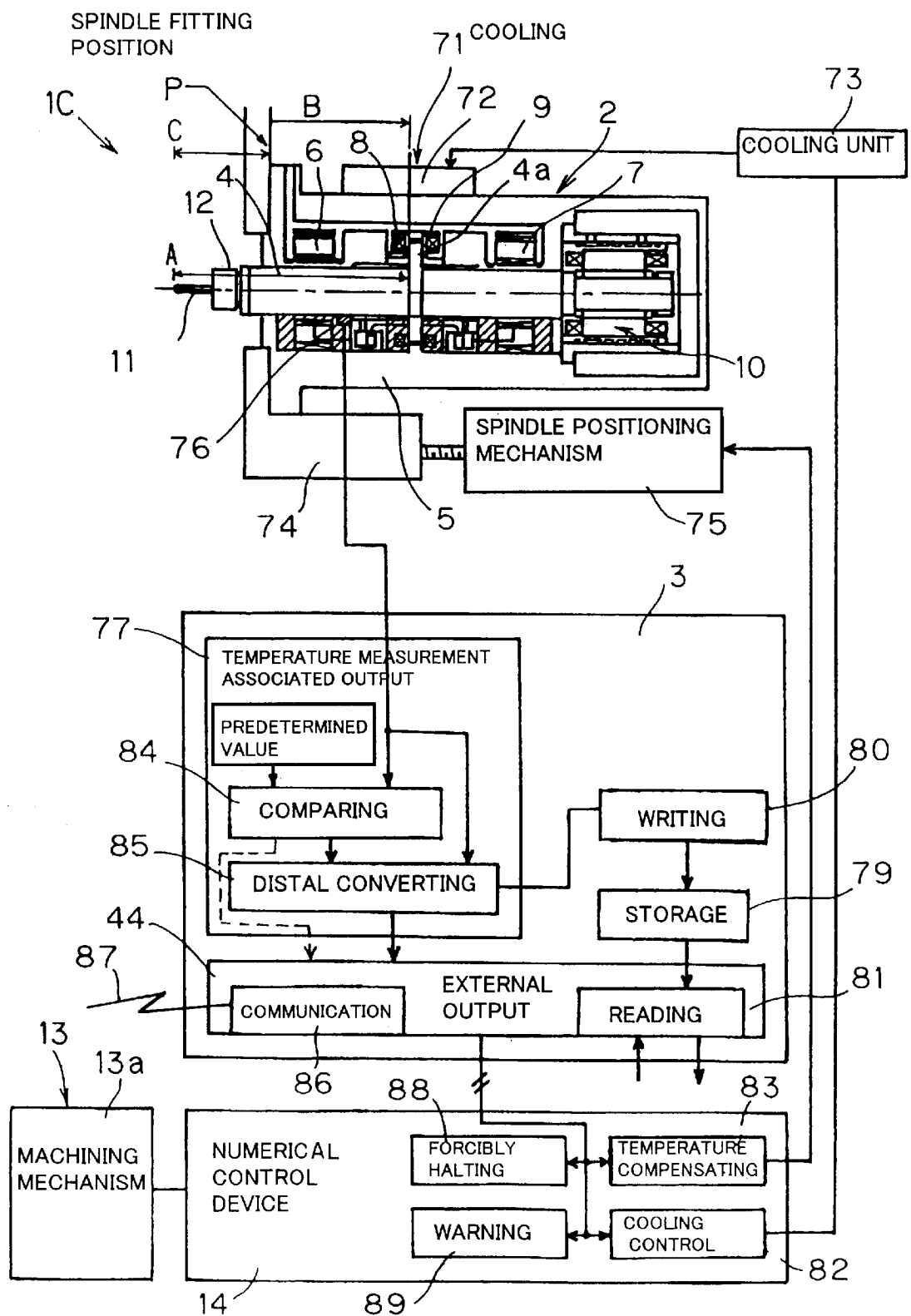
FIG. 22 is a block diagram showing a conceptual configuration of the spindle device according to a fourth preferred embodiment of the present invention.

The spindle device 1C equipped with the combined externally pressurized gas-magnetic bearing assemblies according to a fourth preferred embodiment of the present invention is shown in FIG. 22. Even in the embodiment shown in FIG. 22, component parts of the spindle device 1C that are alike those employed in the spindle device 1 of the first embodiment shown particularly in FIG. 1 are shown by like reference numerals.

In the spindle device 1C shown therein, a cooling means 73 is utilized, which includes a coolant flow passage 74 such as, for example, a water jacket provided in the housing 5, and a cooling unit 75 for circulating a cooling medium such as, for example, a cooling water through the coolant flow passage 74.

This spindle device 1C is incorporated in the machining apparatus 13 such as, for example, a high speed milling machine or a high speed grinding machine and the machining mechanism 13*a* of the machining apparatus 13 is controlled by the numerical control device 14. The housing 5 of the spindle device 1C is fixed to a spindle support fixture 76 and can be moved together with the spindle support fixture 76 by the spindle positioning mechanism 54 in a direction axially of the main shaft 4. The spindle support fixture 76 is, as is the case with that shown in FIG. 16, movably mounted on the bench 52 through the guide mechanism 53. The spindle positioning mechanism 54 may comprise a servo-motor and a ball screw mechanism.

The spindle device 1C is of a design in which in the basic structure of the spindle device described above, a temperature measuring means 77 is provided on the housing 5 for the main shaft 4; the spindle controller 3 is provided with a temperature measurement associated output means 78, the external output means 44, a storage means 79, a writing means 80 and a reading means 81; and the numerical control device 14 is provided with a cooling control means 82, a temperature compensating means 83, a forcibly halting means 88 and a warning means 89. Also, the main shaft 4 is made of a material having a low coefficient of thermal expansion such as, for example, a soft magnetizable material of a low coefficient of thermal expansion, such as Invar.

A control system employed in the practice of the fourth embodiment of the present invention will now be described. Referring to FIG. 22, the spindle controller 3 has a basic function of applying an exciting current to the magnetic bearings 6B to 9B (See FIG. 1) of the combined externally pressurized gas-magnetic bearing assemblies 6 to 9 according to the current values detected respectively by the displacement detecting means 28 and 38.

The temperature measuring means 77 provided in the housing 5 is operable to detect the housing temperature of a portion of the housing on one side of the collar 4a of the main shaft 4 adjacent the machining tool 11 and is employed in the form of a temperature sensitive element such as, for example, a platinum resistance element or a thermocouple. This temperature measuring means 77 may be of a type utilizing a measured value of the resistance of the electromagnet coil 25 (See FIG. 4) of the magnetic bearing 6.

The temperature measurement associated output means 78 comprises, in the illustrated embodiment, a comparing means 84 and a digital converting means 85. The comparing means 84 compares a temperature measurement value, which is an output from the temperature measuring means 77, with a predetermined value which serves as a threshold value, and outputs an abnormality signal in the event that the temperature measurement value exceeds the predetermined value. The comparing means 84 may be employed in the form of a comparator made up of electronic component parts. This comparing means 84 may be of a type capable of comparing the temperature measurement value with one of a plurality of predetermined values to provide one of a plurality of abnormality signals depending on which one of the predetermined values the temperature measurement value has exceeded. The digital converting means 85 serves as a means for converting an analog output signal from the temperature measuring means 7 into a digital value. If the comparing means 84 is of a type outputting a mere binary signal, the digital converting means 85 serves as a means for converting the output from the comparing means 84 into a digital value represented by a plurality of digits. The temperature measurement associated output means 78 outputs an abnormality signal resulting from the temperature measurement value or the digital value outputted from the digital converting means 85. It is to be noted that the abnormality signal outputted from the comparing means 84 may be utilized as an output from the temperature measurement associated output means 78 without being processed in any way whatsoever.

The writing means 80 is operable to cause the storage means 79 to store the temperature measurement value in the form of the digital value, which is an output from the temperature measurement associated output means 78, and the abnormality signal. The storage means 79 is capable of accumulating and storing the temperature measurement value and the abnormality signal that are outputted one after another. This storage means 79 is employed in the form of, for example, a memory element, a magnetic disc device or any other suitable large capacity storage device.

The external output means 44 serves as a means for outputting the various outputs from the temperature measurement associated output means 78 to the outside of the spindle controller 3. This external output means 44 may comprise an interface in the form of a mere output port, but in the illustrated embodiment it includes a communication means 58 and a reading means 81.

The communication means 58 is a means for communicating to a remote place through a communication line 59 such as, for example, a telephone network or a data communication network. The reading means 81 serves a means for outputting data stored in the storage means 79 in response to a command from the outside of the spindle controller 3 and is capable of outputting in response to the external command the temperature measurement value and the abnormality signal, that are stored in the storage means 79 during an arbitrary run of the spindle.

The numerical control device 14 serves as a means for controlling the machining mechanism 13a according to the machining program and includes a numerical control function unit for controlling mainly a shaft feed function, and a programmable controller function unit for performing mainly a sequence control. The programmable controller function unit thereof is provided with the temperature compensating means 83, the cooling control means 82, the forcibly halting means 88 and the warning means 89. There may be a case in which the temperature compensating means 83 is provided in the numerical control function unit.

The forcibly halting means 88 operated to forcibly halt the machining apparatus 13 in response to the abnormality signal outputted from the temperature measurement associated output means 78 through the external output means 44. The warning means 89 serves as a means for generating a warning signal in response to the abnormality signal outputted from the temperature measurement associated output means 78 through the external output means 44. The warning signal generated by the warning means 89 may be utilized to trigger an alarm speaker, a warning lamp and/or a display device to display a warning screen.

The cooling control means 82 serves as a means for controlling the cooling means 73 in response to the abnormality signal outputted from the temperature measurement associated output means 78 through the external output means 44 and capable of generating a command for increasing a cooling intensity to the cooling unit 75.

The temperature compensating means 83 serves as a means for controlling the spindle positioning mechanism 54 according to the temperature measurement value outputted from the temperature measurement associated output means 78 through the external output means 44. Specifically, while the amount of movement of the spindle positioning mechanism 54 is as a rule controlled according to a command value of the machining program, the temperature compensating means 83 changes the amount of feed by the mechanism 54 in dependence on the temperature measurement value according to a predetermined temperature compensation calculating equation.

In this temperature compensating calculation, for example, calculation is performed to add the amount of change of the dimension (C dimension) from the position P, at which the spindle device is fitted, to the tip of the machining tool 11 with change in temperature, as a correction value of the amount of feed of the spindle. The C dimension representative of the axial position of the tip of the machining tool 11 is represented by the difference between the dimension (A dimension) of the main shaft 4 as measured from the tip of the machining tool 11 to the main shaft collar 4a and the dimension (B dimension) of the housing 5 as measured from the spindle device fitting position P to the main shaft collar 4a. Accordingly, the amount of thermal expansion of the C dimension can be calculated by the difference between the amount of thermal expansion of the housing of the B dimension and the amount of thermal expansion of the main shaft 4 of the A dimension. Since the housing 5 and the main shaft 4 are not in contact with each other and there is a difference in temperature and temperature change, the temperature measuring means 77 for measuring the temperature of the housing 5 cannot be used to measure the temperature of the main shaft 4. In addition, since the main shaft 4 rotates at a high speed, it is not easy to measure the temperature of the main shaft 4 with the use of a separate sensor. For this reason, the amount of thermal expansion of the main shaft 4 may be calculated using a temperature which has been inferentially calculated from the temperature detected by the temperature measuring means 77, or the amount of thermal expansion of the main shaft 4 may be not be taken into consideration. Accordingly, where the low thermal expansion material is used as material for the main shaft 4, an error for the thermal expansion compensation is sufficient to be small.

Figure 23:
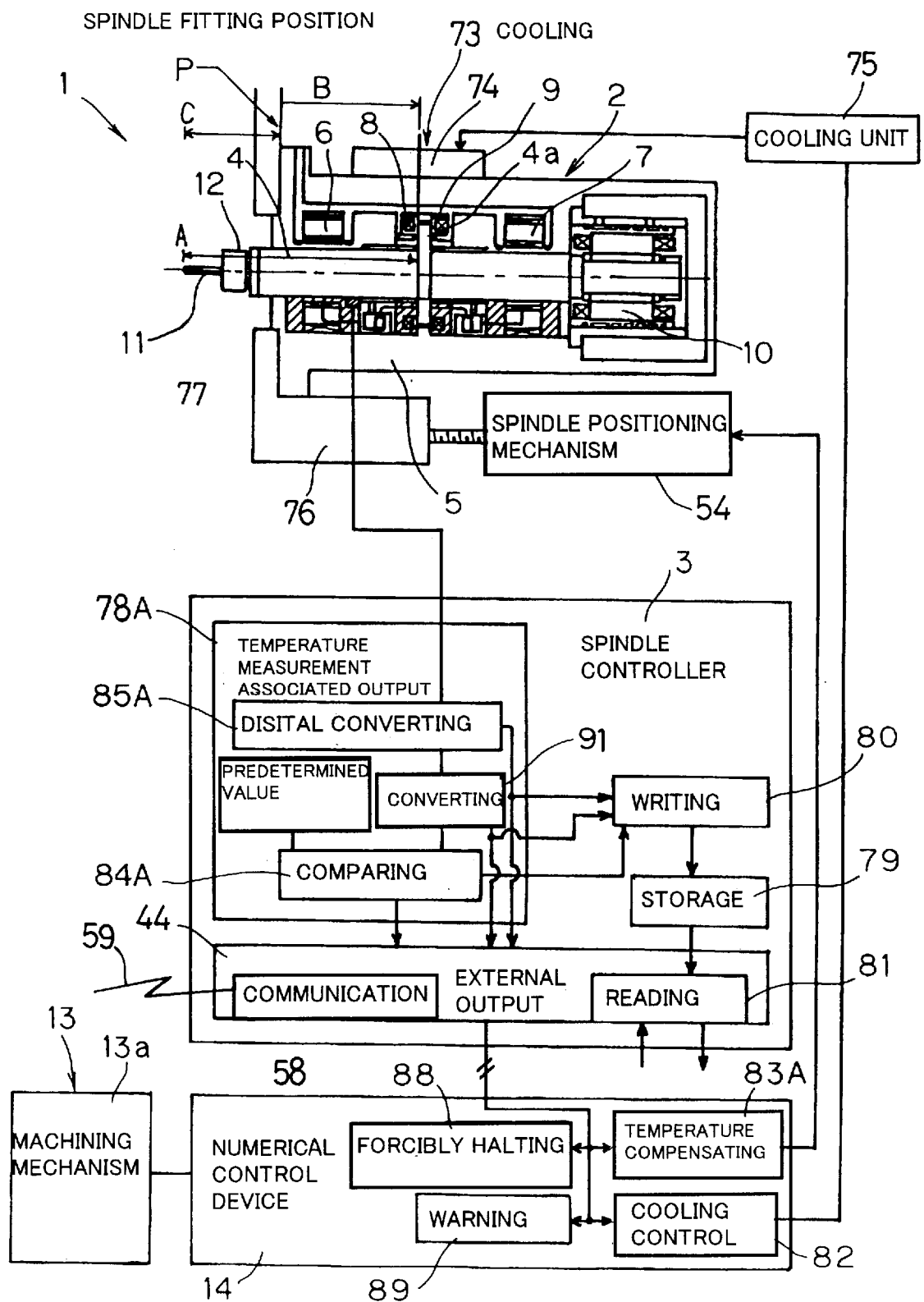
FIG. 23 is a block diagram showing a conceptual configuration of the spindle device according to a fifth preferred embodiment of the present invention.

FIG. 23 illustrates a fifth preferred embodiment of the present invention. According to the embodiment shown in FIG. 23, the temperature measurement associated output means 78A is shown to have a converting means 91 and a comparing means 84A following the converting means 91. Also, the temperature measurement associated output means 78A has a digital converting means 85A disposed in an input stage thereof, which converting means 85A outputs to the converting means 91 a signal indicative of the temperature measurement value which has been converted into a digital value. The converting means 91 is operable to convert the temperature measurement value from the temperature measuring means 77 into the axial position of the tip of the main shaft 4 according to a predetermined thermal displacement calculation or into the axial position (C dimension) of the tip of the machining tool 11 which is a member fitted to the tip of the main shaft 4. The comparing means 84A compares the converted value, outputted from this converting means 91, with a predetermined value and outputs an abnormality signal in the event that the converted value exceeds the predetermined value. The temperature measurement associated output means 78A outputs such a temperature measurement value output of the digital converting means 85A, output from the converting means 91 and the abnormality signal from the comparing means 84A.

The external output means 44 outputs each of those outputs from the temperature measurement associated output means 78A to the outside of the spindle controller 3. The writing means 80 causes the storage means 79 to store those outputs from the temperature measurement associated output means 78A. The temperature compensating means 83A performs a temperature compensating calculation using the converted value outputted from the converting means 91.

Other structures and functions in this embodiment are similar to those according to the previously described embodiment shown in FIG. 22. It is, however, to be noted that in the practice of the embodiment of FIG. 23, the comparing means 84A may be so designed as to compare the temperature measurement value from the temperature measuring means 77, rather than to compare the converted value, with the predetermined value and then to output the abnormality signal as is the case with the previously described embodiment of FIG. 22, or as to compare the temperature measurement value represented by the digital value having been converted by the digital converting means 85A, with the predetermined value and then to output the abnormality signal.

By way of example, the abnormality signal may be generated by comparing the temperature measurement value (or the digital value thereof) from the temperature measuring means 77 with the predetermined value by the use of the comparing means 84A and the converted value output from the converting means 91 may be used in the temperature compensating calculation performed by the temperature compensating means 83A.

With the spindle device 1C according to any one of the fourth and fifth embodiments shown in FIGS. 22 and 23, respectively, even though the temperature of the spindle device 1C changes, the spindle positioning amount can be temperature-compensated and, therefore, the work can be machined with a high precision. Also, in the event of abnormality occurring in the spindle device as a result of an excessive increase of the housing temperature, the signal can be outputted to the outside so that the spindle device 1C can be halted and/or the warning can be effected.

Figure 25:
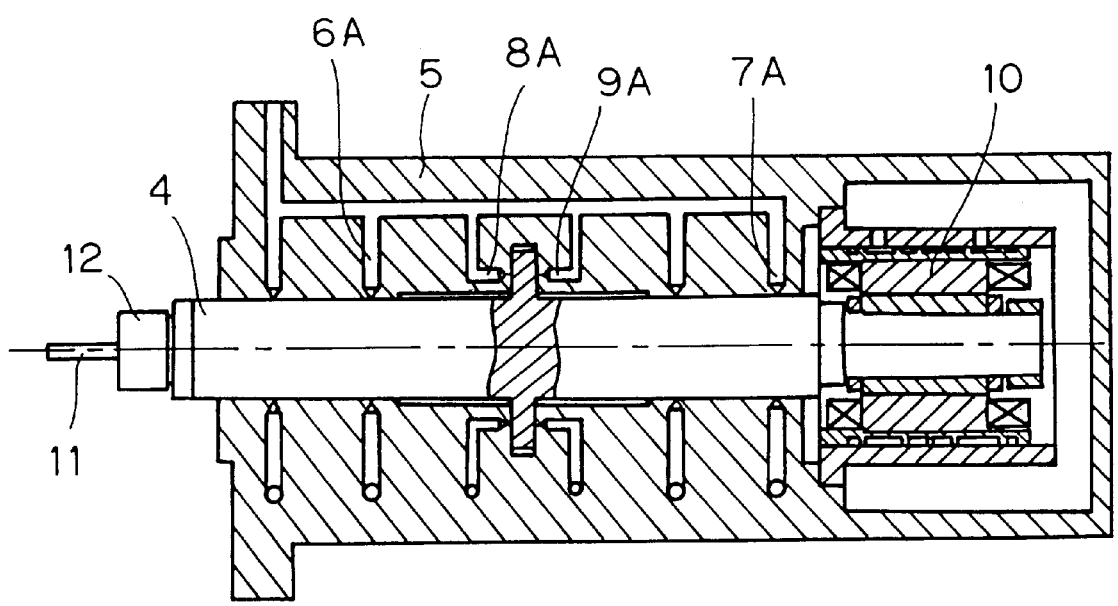
FIG. 25 is a longitudinal sectional view of a spindle device main body of the spindle device according to a sixth preferred embodiment of the present invention.

In describing any one of the foregoing embodiments, the spindle device 1C has been described as having the combined externally pressurized gas-magnetic bearing assemblies 6 to 9. However, it is to be noted that such embodiment can be equally applied to the spindle device in which the main shaft 4 is rotatably supported only by the externally pressurized gas bearings. By way of example, in any one of the foregoing embodiments, in place of the combined externally pressurized gas-magnetic bearing assemblies 6 to 9, only the externally pressurized gas bearings 6A to 9A may be utilized as shown in FIG. 25.

Figure 24:
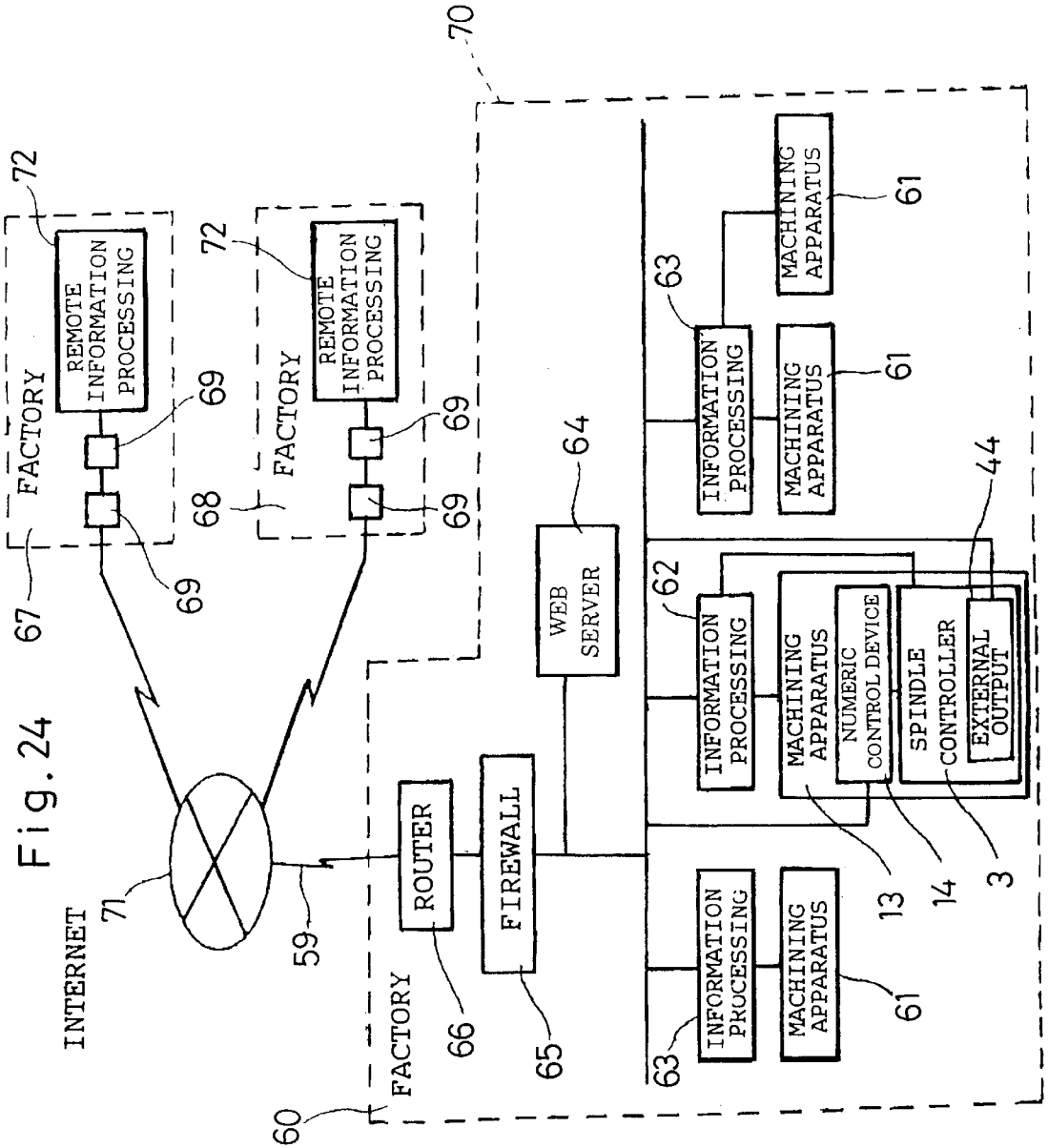
FIG. 24 is a block diagram showing a conceptual configuration of a communication system connected with the spindle device shown in FIG. 23.

With respect to the communication system, a communication system in which the communication means provided in the numerical control device 14 and the communication means 58 (FIGS. 22 and 23) of the external output means 44 provided in the spindle controller 3 are connected directly to the communication line of the local area network 70 shown in FIG. 24 may be utilized.

Figure 26:
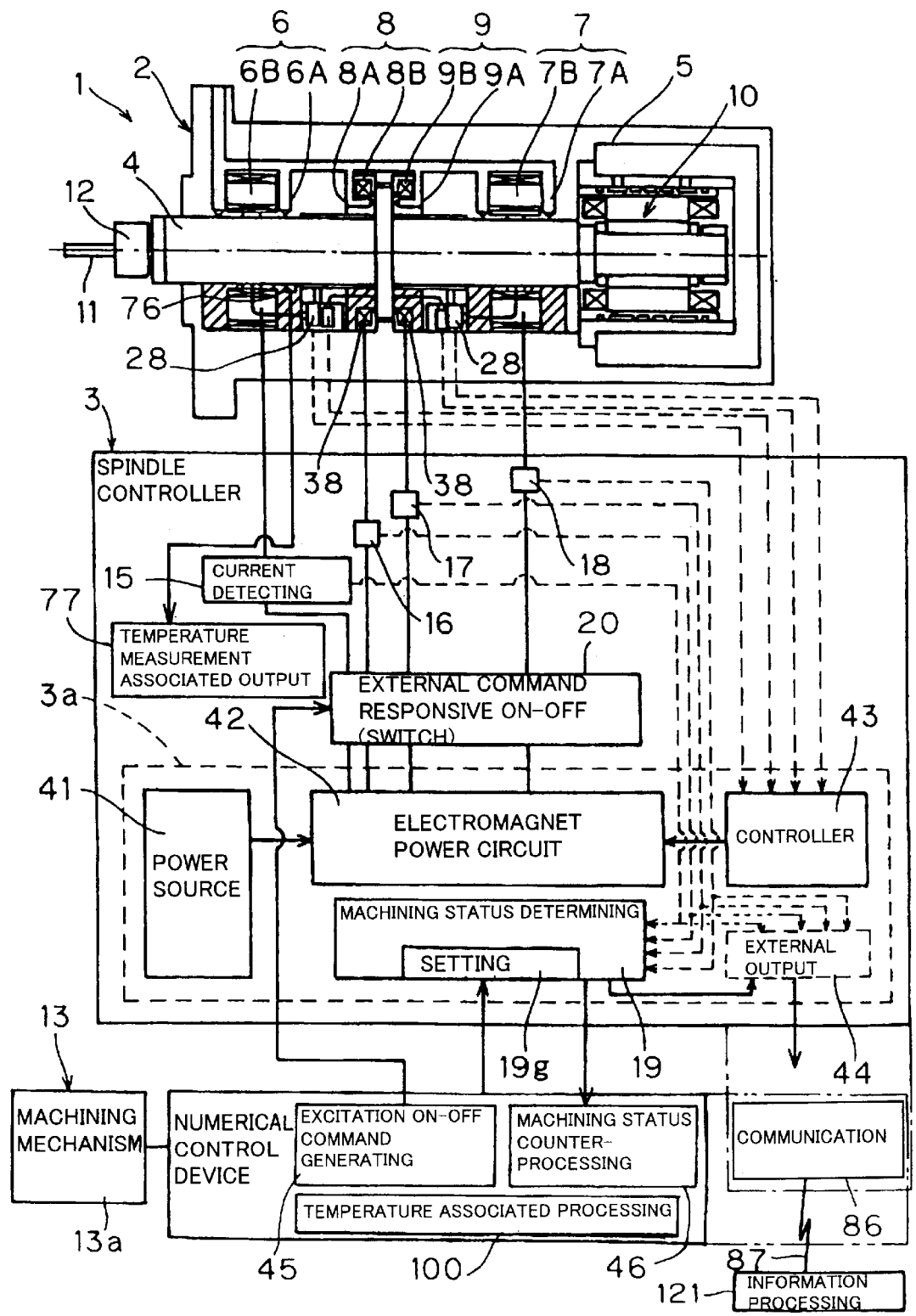
FIG. 26 is a block diagram showing a conceptual configuration of the spindle device employed in a mold machining tool according to a seventh preferred embodiment of the present invention.

FIG. 26 illustrates a sixth preferred embodiment of the present invention. In this sixth embodiment, component parts of the spindle device 1 that are alike those employed in the spindle device 1 of the embodiment shown particularly in FIG. 1 are shown by like reference numerals. The mold machining apparatus 13 shown therein is similar to that used in the embodiment of FIG. 16 and includes the spindle device 1 for rotating the machining tool 11 and the table arrangement 51 (FIG. 17) for moving the work W to be machined into a mold. The spindle device 1 includes a spindle device main body 2 made up of mechanisms and a spindle controller 3 for controlling the spindle device main body 2. The spindle device main body 2 and the table arrangement 51 altogether constitute the machining mechanism 13a that is adapted to be controlled by the numerical control device 14.

As is the case with the embodiment shown in FIG. 1, the spindle device main body 2 is movably mounted on the bench 52 at a location aligned with the table arrangement 51 shown in FIG. 16 through the guide mechanism 53 and the spindle support fixture 76 and can be moved reciprocally in the direction (Z-axis direction) axially of the spindle shaft by means of the spindle positioning mechanism 54.

In the embodiment shown in FIG. 26, the spindle controller 3 is provided with the external output means 44 together with the current detecting means 15 to 18, the machining status determining means 19, the external command responsive ON-OFF means 20 and the temperature measurement associated output means 78, and the numerical control device 14 is provided with the excitation ON-OFF command generating means 45, the machining status counter-processing means 46 and the temperature associated processing means 100. The current detecting means 15 to 18 is employed in the form of, for example, a current detector. The external output means 44 concurrently serve as a means for outputting the output from the temperature measurement associated output means 78 to the outside.

Figure 27:
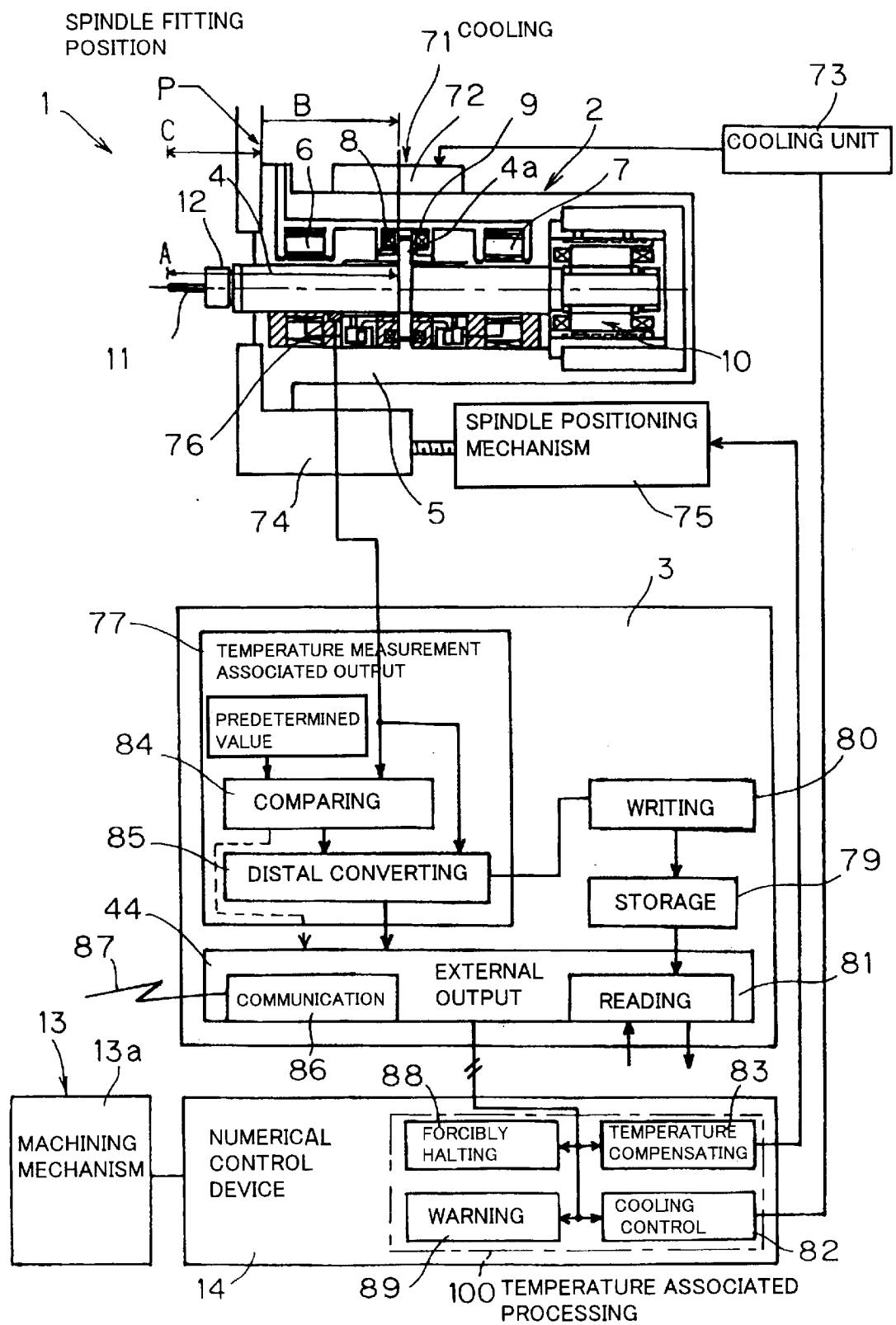
FIG. 27 is a block diagram showing a temperature measurement output means employed in the spindle device in the mold machining tool.

FIG. 27 illustrates a block diagram showing mainly the temperature measurement associated output means 78 of the spindle device 1 employed in the mold machining apparatus 13. Countermeasures against the thermal expansion of the housing 5 and others will be described with reference also to FIG. 27. As is the case with the embodiment shown in FIG. 22, the spindle device 1 includes the cooling means 73 which includes a coolant flow passage 74 such as, for example, a water jacket provided in the housing 5, and a cooling water through the coolant flow passage 74. The main shaft 4 is made of a material having a low coefficient of thermal expansion such as, for example a soft magnetic material of a low coefficient of thermal expansion, for example, invar.

The housing 5 is provided with the temperature measuring means 77, and the spindle controller 3 is provided with the temperature measurement associated output means 78, the external output means 44, the storage means 79, the writing means 80 and the reading means 81. Also, the numerical control device 14 is provided with, as a temperature associated processing means 100, the cooling control means 82, the temperature compensating means 83, the forcibly halting means 88 and the warning means 89.

As is the case with that in the embodiment shown in FIG. 22, the temperature measuring means 77 is operable to detect the housing temperature at a portion of the housing 5 on one side of the collar 4*a* of the main shaft 4 adjacent the machining tool 11 and is employed in the form of a temperature sensitive element such as, for example, a platinum resistance element or a thermocouple. This temperature measuring means 77 may be of a type utilizing a measured value of the resistance of the electromagnet coil 25 (See FIG. 4) of the magnetic bearing 6.

As is the case with that in the embodiment shown in FIG. 22, the external output means 44 serves as a means for outputting the various outputs from the temperature measurement associated output means 78 to the outside of the spindle controller 3. This external output means 4 may comprise an interface in the form of a mere output port, but in the illustrated embodiment it includes a communication means 58 and a reading means 81. The communication means 58 is a means for communicating to a remote place through a communication line 59 such as, for example, a telephone network or a data communication network. The reading means 81 serves a means for outputting data stored in the storage means 79 in response to a command from the outside of the spindle controller 3 and is capable of outputting in response to the external command the temperature measurement value and the abnormality signal, that are stored in the storage means 79 during an arbitrary run of the spindle.

It is to be noted that although the external output means 44 employed in the illustrated embodiment concurrently serve as a means for outputting the output from the machining status determining means 19 to the outside, a separate external output means may be employed for each of the machining status determining means 19 and the temperature measurement associated output means 78. It is also to be noted that the writing means 80 may concurrently serve as a means for storing the output from the machining status determining means 19 in the storage means 79, in which case the reading means 81 may be of a type capable of outputting the stored contents in the storage means 79, associated with the result of determination of the machining status, in response to a command supplied from the outside.

Figure 28:
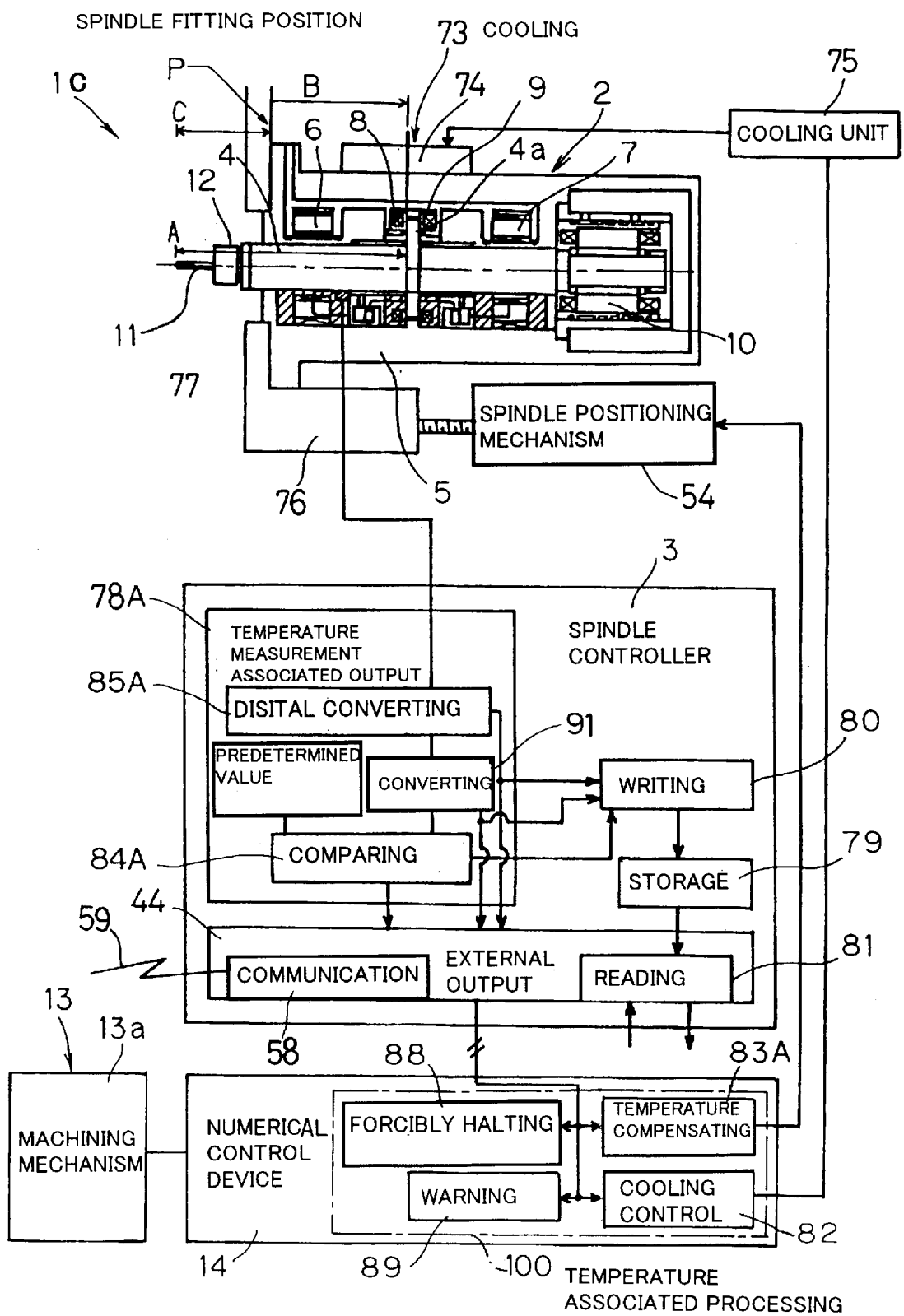
FIG. 28 is a block diagram showing a conceptual configuration of the spindle device employing a modified form of the temperature measurement output means.
Figure 29:
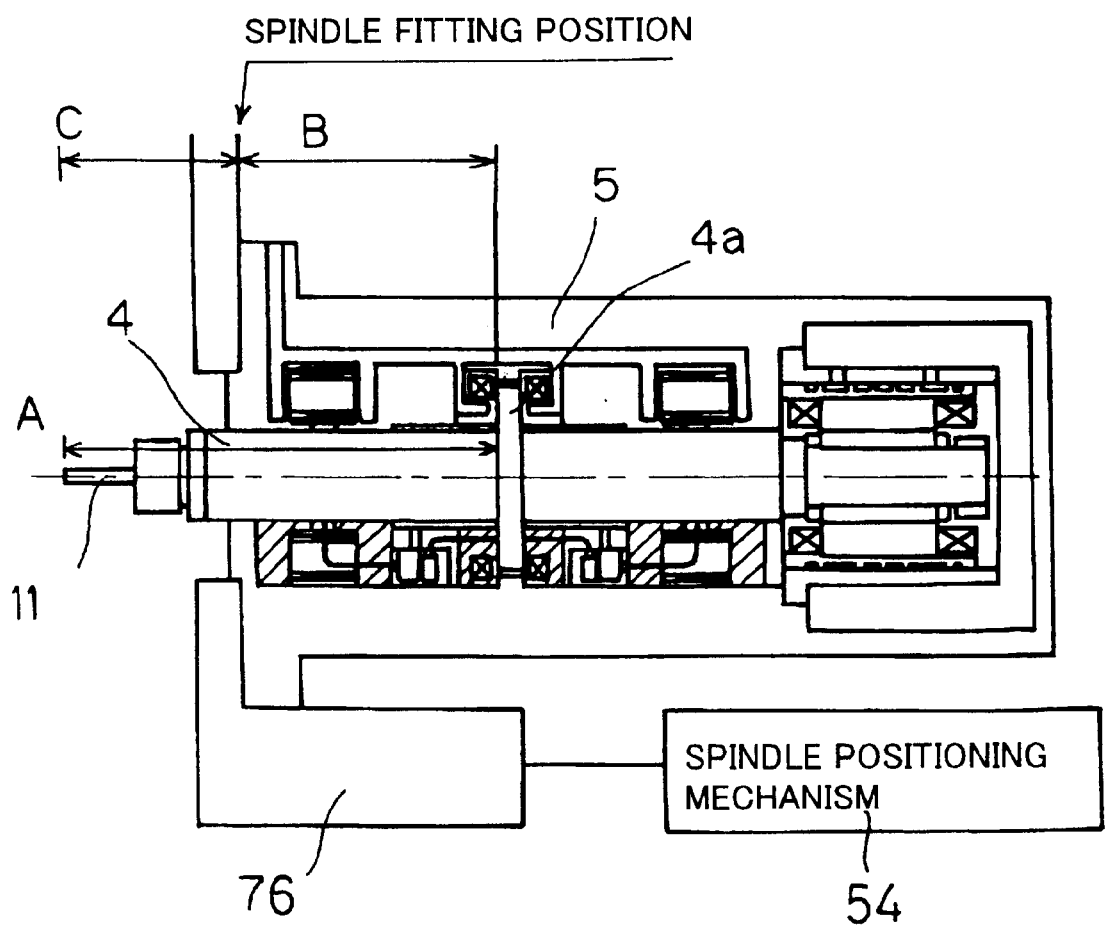
FIG. 29 is a schematic longitudinal sectional view of the prior art spindle device.

FIG. 28 illustrates a block diagram showing a conceptual configuration of the spindle device 1 showing mainly a modified form of the temperature measurement associated output means 78. This structure is substantially similar to that in the embodiment shown in FIG. 23 and, therefore, the details thereof are not reiterated for the sake of brevity.

The communication means 58 is capable of transmitting the output from the temperature measurement associated output means 78 and the contents stored in the storage means 79 (FIGS. 27 and 28) through the communication line 59. The remote information processing means 72 may be of a design capable of performing a predetermined process on the output from the communicated temperature measurement associated output means 78 and applying the command to the mold machining apparatus. By way of example, the remote information processing means 72 may have a function of the temperature associated processing means 100.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in any one of the embodiments shown in and described with reference to FIGS. 26 to 28, the communication means 58 in the communication system may be of a type concurrently serving as the external output means 44 or forming a part of the external output means 44.

Accordingly, such changes and modifications are, unless they depart from the scope of the present invention as delivered from the claims annexed hereto, to be construed as included therein.

What is claimed is:

1. A spindle device with at least one combined externally pressurized gas-magnetic bearing assembly for rotatably supporting a main shaft, having a machining tool fitted to a tip thereof, and having a spindle drive source for rotating the main shaft, said at least one combined externally pressurized gas-magnetic bearing assembly comprising an externally pressurized gas bearing and a magnetic bearing combined together, said spindle device comprising:

a spindle controller for controlling the at least one externally pressurized gas-magnetic bearing assembly; and an external command responsive ON-OFF means for turning energization of the magnetic bearing on and off in response to a command supplied from an outside of the spindle controller without starting or stopping the spindle drive source;

an electric current detecting means for detecting an excitation current for the magnetic bearing; and a machining status determining means for determining a machining status performed by the machining tool in reference to a current value detected by the current detecting; means;

wherein said machining status determining means comprises a current smoothing unit for smoothing the current value detected by the current detecting means, and a machining status determining unit for converting a smoothed output from the current smoothing unit into a static load acting on the main shaft and for determining the machining status in reference to a result of calculation of the static load.

2. The spindle device as claimed in claim 1, wherein said current detecting means is provided in the spindle controller for controlling the at least one combined externally pressurized gas-magnetic bearing assembly.

3. The spindle device as claimed in claim 1, wherein said machining status determining means comprises a frequency analyzing unit for frequency analyzing an output from the current detecting means or a displacement detecting means, and a machining status determining unit for determining the machining status in reference to an amplitude of each of frequency components during a machining, which components are outputted from the frequency analyzing unit.

4. The spindle device as claimed in claim 1, further comprising an external output means for outputting to an outside of the spindle controller one of a current value detected by the current detecting means, the smoothed output from the current smoothing unit, and an amplitude of each of frequency components outputted from a frequency analyzing unit.

5. A system for remotely determining the machining status of a spindle device comprising:
the spindle device as defined in claim 1;
an information processing means installed at a remote place distant from the spindle device;
a communication line for communicating one of an output from the machining status determining means the current value detected by the current detecting means, the smoothed output from the current smoothing unit, and an amplitude of each of frequency components outputted from a frequency analyzing unit, to the information processing means installed at the remote place;
wherein said information processing means has a function of performing a predetermined process on the communicated information.

6. A spindle device with at least one combined externally pressurized gas-magnetic bearing assembly for rotatably supporting a main shaft, having a machining tool fitted to a tip thereof, and having a spindle drive source for rotating the main shaft, said at least one combined externally pressurized gas-magnetic bearing assembly comprising an externally pressurized gas bearing and a magnetic bearing combined together, said spindle device comprising:
a spindle controller for controlling the at least one externally pressurized gas-magnetic bearing assembly; and
an external command responsive ON-OFF means for turning energization of the magnetic bearing on and off in response to a command supplied from an outside of the spindle controller without starting or stopping the spindle drive source;
displacement detecting means for detecting a displacement of the main shaft; and
a machining status determining means for determining a machining status performed by the machining tool in reference to the displacement value detected by the displacement detecting means.

7. The spindle device as claimed in claim 4, wherein said machining status determining means comprises a frequency analyzing unit for frequency analyzing an output from a current detecting means or the displacement detecting means, and a machining status determining unit for determining the machining status in reference to an amplitude of each of frequency components during a machining, which components are outputted from the frequency analyzing unit.

8. The spindle device as claimed in claim 4, further comprising an external output means for outputting to an outside of the spindle controller one of a current value detected by a current detecting means, a smoothed output from a current smoothing unit, and an amplitude of each of frequency components outputted from a frequency analyzing unit.

9. A system for remotely determining the machining status of a spindle device comprising:
the spindle device as defined in claim 6;
an information processing means installed at a remote place distant from the spindle device;
a communication line for communicating one of an output from the machining status determining means a current value detected by a current detecting means, a smoothed output from a current smoothing unit, and an amplitude of each of frequency components outputted from a frequency analyzing unit, to the information processing means installed at the remote place;
wherein said information processing means has a function of performing a predetermined process on the communicated information.

10. The spindle device as claimed in claim 1 or 6, wherein said spindle drive source comprises a motor built in a housing, and wherein the at least one combined externally pressurized gas-magnetic bearing assembly is housed within the housing.

11. A spindle device with at least one combined externally pressurized gas-magnetic bearing assembly for rotatably supporting a main shaft, having a machining tool fitted to a tip thereof, a spindle drive source for rotating the main shaft and a spindle controller for controlling the at least one combined externally pressurized gas-magnetic bearing assembly, said at least one combined externally pressurized gas-magnetic bearing assembly comprising an externally pressurized gas bearing and a magnetic bearing combined together, said spindle device comprising:
an externally command responsive ON-OFF means for turning energization of the magnetic bearing on and off in response to a command supplied from an outside of the spindle controller without starting or stopping the spindle drive source.

12. The spindle device as claimed in claim 11, wherein said external command for turning the energization on and off is supplied from a numerical control device of a machining apparatus equipped with the spindle device.

13. A machining apparatus equipped with a spindle device as defined in claim 11, said machining apparatus comprising a numerical control device for controlling a machine section of the machining apparatus and an energization ON-OFF command generating means for applying an energization ON-OFF command to the externally command responsive ON-OFF means.

14. The machining apparatus as claimed in claim 13, wherein said external command for turning the energization on and off is a command that turns on the magnetic bearing during a first machining, but turns the magnetic bearing off during a second machining.

15. A remote controlled spindle device which spindle device comprises:
the spindle device as defined in claim 11 having the at least one combined externally pressurized gas-magnetic bearing assembly, and
an information processing means installed at a remote place distant from the spindle controller and capable of communicating with the spindle controller through a communication line, said information processing means having a function of applying a command to [an] the externally command responsive ON-OFF means.

16. A spindle device comprising a main shaft;
at least one combined externally pressurized gas-magnetic radial bearing assembly in which an externally pressurized gas bearing and a magnetic bearing are combined together, said at least one combined bearing assembly supporting the main shaft rotatably;
a housing accommodating the at least one combined bearing assembly and the main shaft therein;
a spindle controller for controlling the at least one externally pressurized gas-magnetic bearing assembly; and
an external command responsive ON-OFF means for turning energization of the magnetic bearing on and off in response to a command supplied from an outside of the spindle controller without starting or stopping the rotation of the spindle device;
slide members disposed within the housing and positioned adjacent the main shaft with a radial gap, radial being defined with respect to an axis of rotation of the main shaft, defined between them and the main shaft, said radial gap having a size smaller than a radial bearing gap defined by the externally pressurized gas bearing and the magnetic bearing both forming respective part of the at least one combined bearing assembly, each of said slide members being made of carbon or graphite.

17. The spindle device as claimed in claim 16, wherein the magnetic bearing of the at least one combined bearing assembly has a bearing core, said bearing core defining an externally pressurized gas bearing surface.

18. The spindle device as claimed in claim 16, wherein said slide members are disposed adjacent respective opposite ends of the main shaft.

19. The spindle device as claimed in claim 16, wherein the slide members have a Shore hardness of not smaller than 50, a bending strength of not smaller than 400 $Kgf/cm^2$, a compressive strength of not smaller than 700 $Kgf/cm^2$ and a coefficient of thermal expansion of not greater than $5\times10^{-6}$.

20. A spindle device which comprises:
a main shaft;
at least one combined externally pressurized gas-magnetic bearing assembly comprising an externally pressurized gas bearing and a magnetic bearing combined together, for supporting the main shaft rotatably;
a housing accommodating the main shaft and the at least one combined bearing assembly therein;
a spindle controller for controlling the at least one externally pressurized gas-magnetic bearing assembly; and
an external command responsive ON-OFF means for turning energization of the magnetic bearing on and off in response to a command supplied from an outside of the spindle controller without starting or stopping the rotation of the spindle device;
a temperature measuring means for measuring a temperature of the housing; and
a temperature measurement associated output means for determining a predetermined output in reference to a temperature value detected by the temperature measuring means, wherein said predetermined output is represented by at least one of (i) an output from the temperature measuring means, (ii) a converted value obtained by converting the temperature value measured by the temperature measuring means into an axial position of a tip of the main shaft or an axial position of a member fitted to the tip of the main shaft, according to a predetermined thermal displacement calculation, and (iii) an abnormality signal determined by comparing the temperature value measured by the temperature measuring means or the converted value with a predetermined value, wherein the axial positions are axial with respect to an axis of rotation of the main shaft; and
an external output means for outputting the predetermined output from the temperature measurement associated output means to an outside of the spindle device.

21. The spindle device as claimed in claim 20, wherein the main shaft is made of invar.

22. A spindle device which comprises:
a main shaft;
at least one combined externally pressurized gas-magnetic bearing assembly comprising and externally pressurized gas bearing and a magnetic bearing combined together, for supporting the main shaft rotatably;
a housing accommodating the main shaft and the at least one combined bearing assembly therein;
a spindle controller for controlling the at least one externally pressurized gas-magnetic bearing assembly;
an external command responsive ON-OFF means for turning energization of the magnetic bearing on and off in response to a command supplied from an outside of the spindle controller without starting or stopping the rotation of the spindle device;
a temperature measuring means for measuring a temperature of the housing;
a temperature measurement associated output means for determining a predetermined output in reference to a temperature value detected by the temperature measuring means, wherein said predetermined output is represented by at least one of (i) an output from the temperature measuring means, (ii) a converted value obtained by converting the temperature value measured by the temperature measuring means into an axial position of a tip of the main shaft or an axial position of a member fitted to the tip of the main shaft, according to a predetermined thermal displacement calculation, and (iii) an abnormality signal determined by comparing the temperature value measured by the temperature measuring means or the converted value with a predetermined value, wherein the axial positions are axial with respect to an axis of rotation of the main shaft; and
an external output means for transmitting the predetermined output from the temperature measurement associated output means to an outside of the spindle device through a communication line.

23. The spindle device as claimed in claim 19, wherein the temperature measurement associated output means outputs a digital signal.

24. The spindle device as claimed in claim 20 or 22, further comprising a writing means for causing the temperature value, outputted from the temperature measurement associated output means, or an output of the converted value from the temperature measurement associated output means, to be inputted to and stored in a storage means.

25. The spindle device as claimed in claim 24, further comprising a reading means for outputting data, stored in the storage means, from the storage means in response to a command applied from an outside of the spindle device.

26. The spindle device as claimed in claim 20 or 22, further comprising a cooling means for cooling the housing in which the main shaft is installed, and a cooling control means for controlling an cooling operation of the cooling means in response to the output from the temperature measurement associated output means.

27. The spindle device as claimed in claim 20 or 22, further comprising a spindle positioning mechanism for moving the housing with the main shaft therein in a direction axially of the main shaft, and a temperature compensating means for controlling the spindle positioning mechanism according to the temperature value or the converted value outputted from the temperature measurement associated output means.

28. A mold machining apparatus which comprises:
   a spindle device for driving a machining tool, said spindle device comprising a main shaft and at least one combined externally pressurized gas-magnetic bearing assembly for rotatably supporting the main shaft, said at least one combined bearing assembly comprising an externally pressurized gas bearing and a magnetic bearing combined together;
   a spindle controller for controlling the at least one externally pressurized gas-magnetic bearing assembly; and
   an external command responsive ON-OFF means for turning energization of the magnetic bearing on and off in response to a command supplied from an outside of the spindle controller without starting or stopping the rotation of the spindle device;
   an electric current detecting means for detecting an excitation current for the magnetic bearing; and
   a machining status determining means for determining a machining status performed by the machining tool in reference to a current value detected by the current detecting means,
   wherein said machining status determining means includes a current smoothing unit for smoothing the current value detected by the current detecting means, and a machining status determining unit for converting a smoothed output from the current smoothing unit into a static load acting on the main shaft and for determining the machining status in reference to a result of the calculation of the static load.

29. A mold machining apparatus which comprises:
   a spindle device for driving a machining tool, said spindle device comprising a main shaft and at least one combined externally pressurized gas-magnetic bearing assembly for rotatably supporting the main shaft, said at least one combined bearing assembly comprising an externally pressurized gas bearing and a magnetic bearing combined together;
   a spindle controller for controlling the at least one externally pressurized gas-magnetic bearing assembly;
   an external command responsive ON-OFF means for turning energization of the magnetic bearing on and off in response to a command supplied from an outside of the spindle controller without starting or stopping the rotation of the spindle device;
   a displacement detecting means for detecting a displacement of the main shaft, and
   a machining status determining means for determining a machining status performed by the machining tool in reference to a displacement value detected by the displacement detecting means.

30. The mold machining apparatus as claimed in claim 29, wherein the machining status determining means comprises a frequency analyzing unit for frequency analyzing an output from a current detecting means or the displacement detecting means, and a machining status determining unit for determining the machining status in reference to an amplitude of each of frequency components during a machining, which components are outputted from the frequency analyzing unit.

31. The mold machining apparatus as claimed in claim 28 or 29, further comprising a communication means for transmitting the machining status determined by the machining status determining means to a remote place through a communication line.

32. A mold machining apparatus which comprises:
   a spindle device for driving a machining tool, said spindle device comprising a main shaft and at least one combined externally pressurized gas-magnetic bearing assembly for rotatably supporting the main shaft, said at least one combined bearing assembly comprising an externally pressurized gas bearing and a magnetic bearing combined together;
   a spindle controller for controlling the at least one externally pressurized gas-magnetic bearing assembly; and
   an external command responsive ON-OFF means for turning energization of the magnetic bearing on and off in response to a command supplied from an outside of the spindle controller without starting or stopping the rotation of the spindle device.

33. The mold machining apparatus as claimed in claim 32, wherein the command supplied from the outside of the spindle controller is supplied from a numerical control device for controlling a machine section of the mold machining apparatus.

34. The mold machining apparatus as claimed in claim 33, wherein the command supplied from the outside of the spindle controller is a command used to turn the magnetic bearing on during a rough machining, but to turn the magnetic bearing off during a finish machining.

35. A mold machining apparatus which comprises:
   a spindle device for rotating a machining tool and comprising a main shaft, at least one combined externally pressurized gas-magnetic bearing assembly comprising an externally pressurized gas bearing and a magnetic bearing combined together, said at least one combined bearing assembly supporting the main shaft rotatably;
   a housing accommodating the main shaft and the at least one combined bearing assembly therein;
   a spindle controller for controlling the at least one externally pressurized gas-magnetic bearing assembly; and
   an external command responsive ON-OFF means for turning energization of the magnetic bearing on and off in response to a command supplied from an outside of the spindle controller without starting or stopping the rotation of the spindle device;
   a temperature measuring means for measuring a temperature of the housing;
   a temperature measurement associated output means for determining a predetermined output in reference to a temperature value detected by the temperature measuring means; and
   a temperature associated processing means for performing a predetermined process in reference to the output from the temperature measurement associated output means;
   wherein said predetermined output from the temperature measurement associated output means is represented by at least one of (i) an output from the temperature measuring means, (ii) a converted value obtained by converting the temperature value measured by the temperature measuring means into an axial position of a tip of the main shaft or an axial position of a member fitted to the tip of the main shaft, according to a predetermined thermal displacement calculation, and (iii) an abnormality signal determined by comparing the temperature value measured by the temperature measuring means or the converted value with a predetermined value, wherein the axial positions are axial with respect to an axis of rotation of the main shaft; and a communication means for transmitting the output from the temperature measurement associated output means to a remote place through a communication line.

36. The mold machining apparatus as claimed in claim 35, further comprising a cooling means for cooling the housing in which the main shaft is installed, and wherein as the temperature associated processing means there is provided a cooling control means for controlling a cooling operation of the cooling means in response to the output from the temperature measurement associated output means.

37. The mold machining apparatus as claimed in claim 35, further comprising a spindle positioning mechanism for moving the housing with the main shaft therein in a direction axially of the main shaft, and a temperature compensating means for controlling the spindle positioning mechanism according to the temperature value or the converted value outputted from the temperature measurement associated output means.

38. The mold machining apparatus as claimed in claim 34, wherein a spindle drive source for rotating the main shaft comprises a motor built in the housing in which the main shaft is installed.

* * * * *